United States Patent
Long et al.

(10) Patent No.: US 12,462,164 B2
(45) Date of Patent: Nov. 4, 2025

(54) MODULAR LARGE LANGUAGE MODEL (LLM) GUIDED TREE-OF-THOUGHT SYSTEM

(71) Applicant: Theta Labs, Inc., San Jose, CA (US)

(72) Inventors: Jieyi Long, Santa Clara, CA (US); Mitchell C. Liu, Los Altos, CA (US)

(73) Assignee: Theta Labs, Inc., San Jose, CA (US)

(*) Notice: Subject to any disclaimer, the term of this patent is extended or adjusted under 35 U.S.C. 154(b) by 0 days.

(21) Appl. No.: 18/749,496

(22) Filed: Jun. 20, 2024

(65) Prior Publication Data

US 2025/0232187 A1     Jul. 17, 2025

Related U.S. Application Data

(60) Provisional application No. 63/621,292, filed on Jan. 16, 2024.

(51) Int. Cl.
*G06N 3/098* (2023.01)
*G06N 3/096* (2023.01)

(52) U.S. Cl.
CPC ............ *G06N 3/098* (2023.01); *G06N 3/096* (2023.01)

(58) Field of Classification Search
CPC ................ G06N 3/098; G06N 3/096
See application file for complete search history.

(56) References Cited

U.S. PATENT DOCUMENTS

| | | |
|---|---|---|
| 9,558,748 B2 | 1/2017 | Lane et al. |
| 11,893,981 B1 * | 2/2024 | Clark ............... G06N 20/00 |
| 12,051,205 B1 * | 7/2024 | Deutsch ............ G06T 7/10 |
| 2003/0130849 A1 | 7/2003 | Durston et al. |

(Continued)

FOREIGN PATENT DOCUMENTS

| | | |
|---|---|---|
| CN | 117077791 A | 11/2023 |
| CN | 117271729 A | 12/2023 |

OTHER PUBLICATIONS

Besta, Maciej, et al. "Graph of Thoughts: Solving Elaborate Problems with Large Language Models." arXiv preprint arXiv:2308.09687 (Nov. 24, 2023) (Year: 2023).*

Lu, Pan, et al. "Dynamic prompt learning via policy gradient for semi-structured mathematical reasoning." arXiv preprint arXiv:2209.14610 (Mar. 2, 2023) (Year: 2023).*

Gong, Yuanhao. "Dynamic large language models on blockchains." arXiv preprint arXiv:2307.10549 (2023), pp. 1-5 (Year: 2023).*

(Continued)

*Primary Examiner* — Omar F Fernandez Rivas
*Assistant Examiner* — Michael C. Lee
(74) *Attorney, Agent, or Firm* — American Patent Agency PC; Daniar Hussain; Stephen M. Hou

(57) ABSTRACT

A tree-of-thought (ToT) system is presented that improves problem-solving capabilities of machine learning models, such as auto-regressive large language models (LLMs). The TOT system can solve complex reasoning tasks through trial and error. In this process, the system explores the solution space through a tree-like thought process, allowing for backtracking when necessary. The system augments an LLM with additional modules including a prompter agent, a checker module, a memory module, and a ToT controller. These modules engage in a multi-round conversation with the LLM. The memory module records the conversation and state history of the problem-solving process, which allows the system to backtrack to the previous steps of the thought-process and explore other solution paths. This new system can be applied to a blockchain and/or a distributed computing system.

15 Claims, 16 Drawing Sheets

ToT software system

(56) References Cited

U.S. PATENT DOCUMENTS

| | | | |
|---|---|---|---|
| 2012/0310618 A1* | 12/2012 | B'Far | G06F 11/3447 703/13 |
| 2016/0196492 A1 | 7/2016 | Johnson et al. | |
| 2018/0032082 A1* | 2/2018 | Shalev-Shwartz ... | G05D 1/0231 |
| 2018/0314951 A1* | 11/2018 | Sadamasa | G06N 5/025 |
| 2019/0197402 A1* | 6/2019 | Kovács | A63F 13/60 |
| 2020/0344185 A1* | 10/2020 | Singaraju | G06N 3/008 |
| 2021/0234668 A1* | 7/2021 | Manamohan | H04L 9/0825 |
| 2022/0148299 A1* | 5/2022 | Bonnevie | G06N 3/045 |
| 2022/0229943 A1* | 7/2022 | Uy | G06N 3/08 |
| 2022/0230080 A1* | 7/2022 | Isele | G06N 3/006 |
| 2024/0028589 A1* | 1/2024 | Shatsky | G06F 16/244 |
| 2024/0078230 A1* | 3/2024 | Song | G06F 16/9035 |
| 2024/0419803 A1* | 12/2024 | Blum | G06N 20/00 |

OTHER PUBLICATIONS

Gao, Yeqi, et al. "Gradientcoin: A peer-to-peer decentralized large language models." arXiv preprint arXiv:2308.10502 (Aug. 21, 2023), pp. 1-68 (Year: 2023).*

Hu, Pengbo, et al. "Tree-of-mixed-thought: Combining fast and slow thinking for multi-hop visual reasoning." arXiv preprint arXiv:2308.09658 (Aug. 21, 2023), pp. 1-16 (Year: 2023).*

Sel, Bilgehan, et al. "Algorithm of thoughts: Enhancing exploration of ideas in large language models." arXiv preprint arXiv:2308.10379 (Sep. 28, 2023), pp. 1-43 (Year: 2023).*

Lin, Zheng-Lin, et al. "Solving Linguistic Olympiad Problems with Tree-of-Thought Prompting." Proceedings of the 35th Conference on Computational Linguistics and Speech Processing (2023), pp. 262-269 (Year: 2023).*

Cao, Shulin, et al. "Probabilistic tree-of-thought reasoning for answering knowledge-intensive complex questions." arXiv preprint arXiv:2311.13982 (Nov. 23, 2023). (Year: 2023).*

Lei, Bin, et al. "Boosting logical reasoning in large language models through a new framework: The graph of thought." arXiv preprint arXiv:2308.08614 (Aug. 16, 2023) (Year: 2023).*

Ranaldi, Leonardo, et al. "Empowering multi-step reasoning across languages via tree-of-thoughts." arXiv preprint arXiv:2311.08097 (Nov. 14, 2023). (Year: 2023).*

Hu, Mengkang, et al. "Tree-planner: Efficient close-loop task planning with large language models." arXiv preprint arXiv:2310.08582 (Oct. 12, 2023). (Year: 2023).*

Long, Jieyi, "Nakamoto Consensus with Verifiable Delay Puzzle", Jul. 2021, 20 pages, San Jose, CA, USA.

Long, Jieyi, et al., "Scalable BFT Consensus Mechanism Through Aggregated Signature Gossip", The IEEE International Conference on Blockchain and Cryptocurrency (ICBC), 2019, pp. 360-367, San Jose, CA, USA.

Humza Naveed, et al., "A Comprehensive Overview of Large Language Models," arXiv Preprint, Dec. 27, 2023, 46 pages, United States.

Lei Wang, et al., "A Survey on Large Language Model based Autonomous Agents," arXiv Preprint, Sep. 7, 2023, 35 pages, United States.

Shunyu Yao, et al., "Tree of Thoughts: Deliberate Problem Solving with Large Language Models," arXiv Preprint, Dec. 3, 2023, 14 pages, United States.

Jieyi Long, "Large Language Model Guided Tree-of-Thought," arXiv Preprint, May 15, 2023, 11 pages, United States.

* cited by examiner

Algorithm 1 Policy Gradient based Training Algorithm for the ToT System

302 — 1: Input: training set $P_{train}$, num of training epochs $N$
2: procedure REINFORCE($P_{train}, N$)
304 — 3:    randomly initialized the ToT Controller policy $\pi_p^t$
4:    randomly initialized the Prompter agent policy $\pi_\theta^p$
5:    for $epoch = 1, 2, \ldots N$ do
306 — 6:      $\pi_w \leftarrow \pi_p^t$ if $epoch$ is even, $\pi_\theta^p$ otherwise   ▷ update the selected policy only, fix the other
308 — 7:      for $p_i \in P_{train}$ do
310 — 8:        $r_i \leftarrow reward(\text{ToTSystem}(p_i))$   ▷ attempt to solve problem $p_i$ and obtain reward $r_i$
312 — 9:        $w \leftarrow w + \alpha \nabla_w \log \pi_w r_i$
10:      end for
11:    end for
12: end procedure

FIG. 3

Algorithm 2 Problem Solving Using the ToT System

```
402  1:  Input: problem description from the user p_user, max num of conversation rounds K
     2:  procedure SOLVE(p_user, K)
404  3:      prompt ← Prompter(p_user)
406  4:      for round = 1, 2, ..., K do
408  5:          response ← LLM(prompt)
410  6:          result ← Checker(response)
412  7:          if result.isValidFinalSolution() then
     8:              return (result.solution)
     9:          end if
414  10:         memory.store(result)
416  11:         ctrl_signal ← ToTController(memory)
418  12:         prompt ← Prompter(memory, ctrl_signal)
     13:     end for
420  14:     return (nil)
     15: end procedure
```

FIG. 4

MODULAR LARGE LANGUAGE MODEL (LLM) GUIDED TREE-OF-THOUGHT SYSTEM

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365 (c), and any and all parent, grandparent, great-grandparent, etc. applications of such applications, are also incorporated by reference, including any priority claims made in those applications and any material incorporated by reference, to the extent such subject matter is not inconsistent herewith.

This application is also related to U.S. Pat. No. 11,763,332, filed on Apr. 30, 2021, entitled "EDGE COMPUTING PLATFORM SUPPORTED BY SMART CONTRACT ENABLED BLOCKCHAIN NETWORK", U.S. Pat. No. 11,611,615, filed on Nov. 16, 2022, entitled "DECENTRALIZED EDGE STORAGE NETWORK WITH FLEXIBLE FILE SHARDING", and U.S. Pat. No. 11,659,015, filed on Oct. 24, 2021, entitled "TRACKER SERVER IN DECENTRALIZED DATA STREAMING AND DELIVERY NETWORK", the entire disclosures of which are hereby incorporated by reference in their entireties herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of problem-solving systems based on Large Language Models (LLMs).

BACKGROUND OF THE INVENTION

The statements in this section may serve as a background to help understand the invention and its application and uses, but may not constitute prior art.

Large language models (LLMs) include a type of artificial intelligence model designed to understand and generate human-like text. They can be trained on a relatively large amount of text data and can generate coherent and contextually relevant sentences by predicting the likelihood of a word given the previous words used in the text. LLMs can be based on a type of machine learning model called a transformer, which uses self-attention mechanisms to weigh the influence of different words in the input when generating the output. The "large" in Large Language Models refers to the number of parameters that the model has, often in the range of billions or even trillions. These parameters are learned during the training process, where the model is exposed to a large corpus of text data. LLMs have a wide range of applications, including but not limited to, text generation, translation, summarization, question answering, and more. They can be used to create chatbots, write articles, generate creative content, and assist in drafting legal documents. They are also used in research to advance our understanding of natural language processing. Despite their impressive capabilities, LLMs also have limitations. They can sometimes generate incorrect or nonsensical responses, and they can be sensitive to slight changes in input phrasing. They also require a large amount of computational resources for training and can inadvertently learn and reproduce biases present in the training data.

Self-attention-based auto-regressive LLMs such as GPT-4 have recently been developed. These LLMs can perform tasks that were previously thought as extremely difficult or even impossible. For example, LLMs can handle various logical and mathematical reasoning tasks, particularly those that entail "short-range reasonings" necessitating only a few steps to arrive at conclusions. Such capabilities may include an initial version of artificial general intelligence (AGI). However, LLMs can exhibit limitations in certain domains, especially for "long-range" reasoning tasks, where long-term planning and solution exploration are necessary. When presenting LLMs such as GPT-4 with a challenging problem-solving task, such as multi-step reasoning problems, the model does not always succeed. Although the generated answer may be indicative of the correct direction, the derivation process may frequently include logical errors.

Therefore, in view of the aforementioned difficulties, there is an unsolved need to provide an LLM-based architecture enabling long range problem-solving.

It is against this background that various embodiments of the present invention were developed.

BRIEF SUMMARY OF THE INVENTION

Methods and systems are provided for an improved LLM-based problem-solving system. More specifically, in one aspect, one embodiment of the present invention is a system including computational modules comprising a prompter agent, a checker module, a memory module, and a controller. The system is configured to receive a problem, engage the computational modules in a problem-solving process comprising a multi-round conversation with a large language model, record the multi-round conversation and state history associated with the problem-solving process on the memory module to determine a first outcome, and potentially backtrack to a previous step of the problem-solving process and determine a second outcome.

In one illustrative embodiment, a non-transitory computer-readable storage medium is provided, having instructions stored therein, which when executed by a processor, cause a tree-of-thought (ToT) controller of a problem-solving system to query a state of a memory module in the problem-solving system. The state comprises a problem description, a current node, a validity of the current node, and a node visit history. The current node and nodes in the node visit history are nodes in a search tree, where the nodes in the search tree represent partial solutions. The validity of the current node is determined by a checker module in the problem-solving system. The instructions also cause the ToT controller to determine, based on the state of the memory module in the problem-solving system, a next search step, where the next search step is selected from the group consisting of the current node, a parent node of the current node, and an ancestor node of the current node in the search tree. The instructions also cause the ToT controller to activate, by sending a control signal, a prompter agent in the problem-solving system to prompt a large language model (LLM) to generate an intermediate solution for the next search step.

In some embodiments, the determining of the next search step by the ToT controller is based on the output of a controller policy network, the controller policy network is trained with a policy gradient reinforcement learning algorithm.

In some embodiments, the determining of the next search step by the ToT controller is based on a rule-based backtracking algorithm.

In some embodiments, the prompter agent is implemented by a prompter policy network, and the prompter policy network takes as input a prompt template, a node visit history, and a set of in-context learning examples, and outputs a prompt for the ToT controller. In some embodiments, the determining of the next search step by the ToT controller is based on the output of a controller policy network, and the controller policy network and the prompter policy network are simultaneously trained with a multi-agent reinforcement learning algorithm.

In some embodiments, the checker module is a neural network classifier.

In some embodiments, the LLM is implemented on one or more edge nodes in a decentralized blockchain-based network.

In some embodiments, the ToT controller is implemented on one or more edge nodes in a decentralized blockchain-based network.

In some embodiments, the instructions further cause the ToT controller to submit the intermediate solution generated by the LLM to a reward smart contract deployed on a blockchain in the decentralized blockchain-based network, wherein the intermediate solution is marked as a valid final solution by the checker module in the problem-solving system. The ToT controller then receives a reward from the reward smart contract for submitting the intermediate solution. In some embodiments, the ToT controller communicates with the memory module and prompter agent through a peer-to-peer connection on the decentralized blockchain-based network.

In some embodiments, the prompter module is run on one or more edge nodes in a decentralized blockchain-based network.

In some embodiments, the problem description is an instance of a puzzle (e.g., Sudoku problem), the intermediate solution is a partial puzzle solution, the checker module is a rule-based checker of a partial puzzle solution, the memory module stores a conversation history between the LLM and the prompter agent, and the ToT controller uses a rule-based backtracking algorithm.

In some embodiments, the problem description is an instance of a multi-step problem-solving task.

In some embodiments, the ToT controller is a module that directs a search process of the problem-solving system by sending the control signal to the prompter agent based on the state of the memory module; the memory module is a module that stores a conversation history between the LLM and the prompter agent; the checker module is a module that determines the validity of the current node; and the prompter agent is a module that generates a prompt for the LLM based on the control signal from the ToT controller.

In other illustrative embodiments, a ToT problem-solving system is provided. The system may comprise access to a large language model (LLM), access to a processor, and a non-transitory physical medium for storing program code executable by the processor, the program code when executed by the processor causing the processor to implement: a prompter agent adapted to generate a prompt for the LLM based on a control signal; a memory module adapted to store a conversation history between the LLM and the prompter agent; a checker module adapted to determine a validity of a current node in a search tree of a search process; and a ToT controller adapted to direct the search process of the ToT problem-solving system by sending the control signal to the prompter agent based on a state of the memory module. The non-transitory physical medium further stores program code that when executed by the processor causes the ToT controller to query the state of the memory module, where the state comprises a problem description, the current node, the validity of the current node, and a node visit history, where the current node and nodes in the node visit history are nodes in the search tree of the search process, where the nodes in the search tree represent partial solutions, and where the validity of the current node is determined by the checker module. The ToT controller may also determine, based on the state of the memory module, a next search step, where the next search step is selected from the group consisting of the current node, a parent node of the current node, and an ancestor node of the current node in the search tree. The ToT controller may also activate, by sending the control signal, the prompter agent to prompt the LLM to generate an intermediate solution for the next search step.

Yet other aspects of the present invention include methods, processes, and algorithms comprising the steps described herein, and also include the processes and modes of operation of the systems and servers described herein.

Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 3 shows a policy gradient based training algorithm for the disclosed systems, in accordance with some embodiments of the present invention;

FIG. 4 shows a second algorithm for solving problems using the ToT system, in accordance with some embodiments of the present invention;

DETAILED DESCRIPTION OF THE INVENTION

Figure 1:
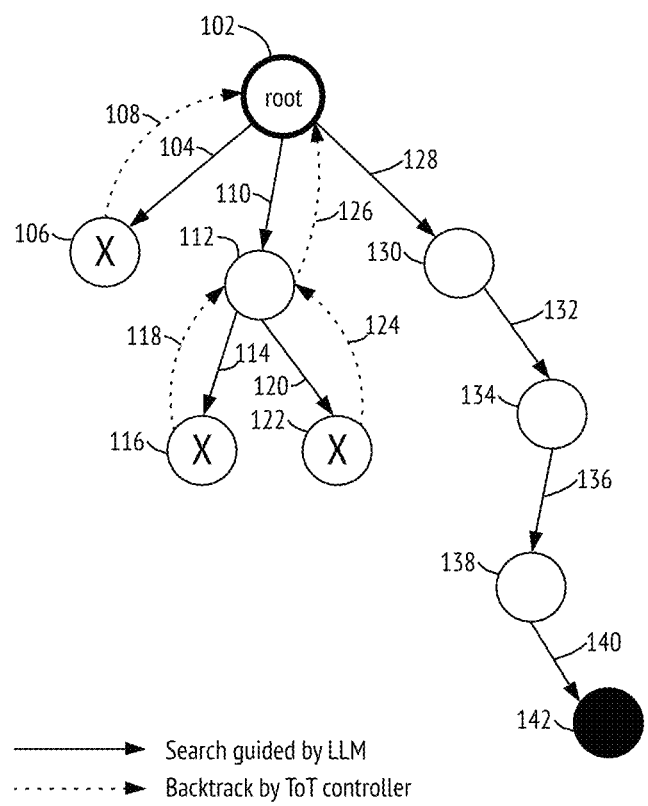
FIG. 1 shows by example a visual description of a tree-of-thought (ToT) search strategy, in which the ToT controller and large language model (LLM) play a role in guiding the search for solutions, in accordance with some embodiments of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

THETA is a trademark name carrying embodiments of the present invention, and hence, the aforementioned trademark names may be interchangeably used in the specification and drawings to refer to the products/services offered by embodiments of the present invention. As the context may require, the term THETA may be used in this specification to describe the overall decentralized computing network or platform, the public ledger system for rewarding computation resource sharing, as well as the company providing said network, platform, system, or services. With reference to the figures, embodiments of the present invention are now described in detail.

LLM-Based Problem-Solving Architectures

Self-attention-based auto-regressive LLMs such as GPT-4 have recently been developed. These LLMs can perform tasks that were previously thought as extremely difficult or even impossible. For example, LLMs can handle various logical and mathematical reasoning tasks, particularly those that entail "short-range reasonings" necessitating only a few steps to arrive at conclusions. Such capabilities may include an initial form of artificial general intelligence (AGI). However, LLMs can exhibit limitations in certain domains, especially for "long-range" reasoning tasks, where long-term planning and solution exploration are necessary. When presenting LLMs such as GPT-4 with a challenging problem-solving task, such as System-2 reasoning problems, the model does not always succeed. Although the generated answer may be indicative of the correct direction, the derivation process may frequently include logical errors.

There may be at least two main contributing factors which limit the problem-solving ability of LLMs: (1) Lack of correctness checking: To ensure correctness, a human solver may carry out verification procedures at every step of the problem-solving process, thereby ensuring the credibility of the final solution. In comparison, an auto-regressive language model may not explicitly perform logical correctness checks as the model generates a new token based on the previous tokens. This can limit the model's capacity to rectify its own mistakes. A minor error can be amplified as the model generates more tokens, thereby leading to rapid solution quality deterioration, making it difficult to recover from mistakes. (2) Solution generated linearly: As mentioned above, LLMs may generate a token based on the preceding sequence of tokens without backward editing. On the contrary, human solvers may attempt to solve a problem by backtracking to previous steps if a derivation step is incorrect, or if they become stuck and unable to make further progress towards arriving at the final answer. The problem-solving process may thus include a tree-like thinking process, rather than a linear chain-of-thought process. The limitation of linear response generation can also be apparent from a computational complexity perspective. The number of computational steps an auto-regressive LLM can perform can be polynomial in terms of its input length. Unless P=NP holds, there are problems in NP that are not solvable by auto-regressive LLMs.

Based at least on the shortcomings of auto-regressive LLMs described above, the disclosure proposes systems and methods which augment an LLM with several additional modules including an automatic prompter agent and a Tree-of-Thought (ToT) controller. The system implements a solution search strategy (i.e., the Tree-of-Thought, or "ToT" in short). This system can solve a problem through a multi-round conversation between the LLM and the prompter agent that is guided by the ToT controller. In this disclosure, the terms "solution search" and "problem-solving" are used interchangeably.

Backtracking Capability and Tree-of-Thought (ToT) Problem-Solving

FIG. 1 shows by example a visual description of the ToT search strategy, in which the LLM and ToT controller play a crucial role in guiding the search for solutions, in accordance with embodiments of the disclosure. As an example, an instance of a Sudoku puzzle is described. The root node 102 represents the initial state, which is the original problem description for the Sudoku puzzle instance. The nodes 112, 128, 134, and 138 in FIG. 1 represent valid partial solutions, which can be used by the LLM as a basis to generate the next search step. In the context of Sudoku puzzle solving, this can include presenting a partially filled Sudoku board to an LLM and letting the LLM fill in a few more cells. The rationale is that an LLM like GPT-4 has been trained on a vast amount of text corpus which includes many Sudoku puzzle solutions. Given a partially filled board, it may be likely that the LLM is able to recognize the pattern, and thus the system may be able to provide useful insights on how to proceed following the Sudoku rules. Hence, it may be highly probable that a search guided by the LLM is significantly more efficient than a brute-force search. In the figure, the search steps guided by the LLM are represented by solid arrows, as illustrated by search steps 104, 110, 114, 120, 128, 132, 136, and 140. However, these steps generated by the LLM are not guaranteed to be always logically correct.

In some aspects, the system can include a checker module to perform correctness checks. In FIG. 1, nodes with an "X" marker, such as nodes 106, 116, and 122, represent "dead-ends", i.e., partial solutions that the checker module considers as invalid. For the Sudoku puzzle, this means the partially filled board violates the Sudoku rules. If the current node is invalid, the system needs to return to a parent or an ancestor node to correct the mistake. This can be coordinated by a module called the "ToT controller" which oversees the ToT search. With the backtracking capability, the system can regenerate the solution and thus recover from errors. In FIG. 1, backtracking steps are denoted by dashed arrows, such as arrows 108, 118, 124, and 126. In addition, even when the current node is valid, if the system remains stuck at it for too long, the ToT controller could issue a backtrack signal to explore other possible solutions. This process continues until either a full valid solution is found, such as the correct solution 142 represented by a solid node in FIG. 1, or a pre-specified maximum round of conversations is reached.

As an illustration of this process, an example instance of solving a Sudoku puzzle in the ToT framework may begin at root node 102. A first search step 104 guided by the LLM is taken. The partial solution 106 is marked invalid by the checker module. The ToT controller issues a signal to take a backtracking step 108 back to root node 102. The LLM then takes another search step 110 and provides a new partial solution 112 for the problem in the root node 102. The partial solution 112 is considered valid by the checker module, and the ToT controller issues a signal which causes the LLM to take the next search step 114 from the state with partial solution 112, to yield a partial solution 116. The partial solution 116 is marked invalid by the checker module, and the ToT controller commands a backtracking step 118 to node 112. From node 112, the LLM then provides another search step 120 to partial solution 122, which is also marked invalid. In order to explore alternate routes, the ToT controller issues a signal to backtrack two steps, step 124 and step 126, back to the root node 102. At this point, the LLM provides a series of search steps 128, 132, 136, and 140 which lead to valid partial solutions 130, 134, 138, and finally the correct solution 142, respectively. The search process returns the correct solution 142 and terminates.

Note that while the above discussion utilized Sudoku solving as a tangible example to illustrate certain aspects of the disclosed systems and methods, the ToT framework can be applied to more general mathematical and logical reasoning, problem-solving, solution searching, and decision making tasks. For example, in the context of mathematical theorem proving, a full solution corresponds to the complete proof, encompassing a total of n derivation steps. On the other hand, a partial solution refers to a subset of these steps, specifically the initial k steps, where k is less than n. The checker verifies the logical correctness of a given partial proof. In parallel, the prompter agent and the ToT controller can offer hints and suggestions to the LLM, encouraging the ToT controller to analyze the subsequent proving step, or explore different directions for theorem proving when necessary.

To evaluate the effectiveness of the ToT framework, a ToT-based Sudoku puzzle solver can be implemented and evaluated on a suite of Sudoku puzzle benchmarks. As follows, the disclosure provides the details of the ToT system architecture, further shows an example implementation of a ToT-based Sudoku puzzle solver, presents the experimental results, and describes the implementation of the ToT framework in a decentralized blockchain-supported edge computing network.

ToT-Based Problem-Solving Architecture

Figure 2:
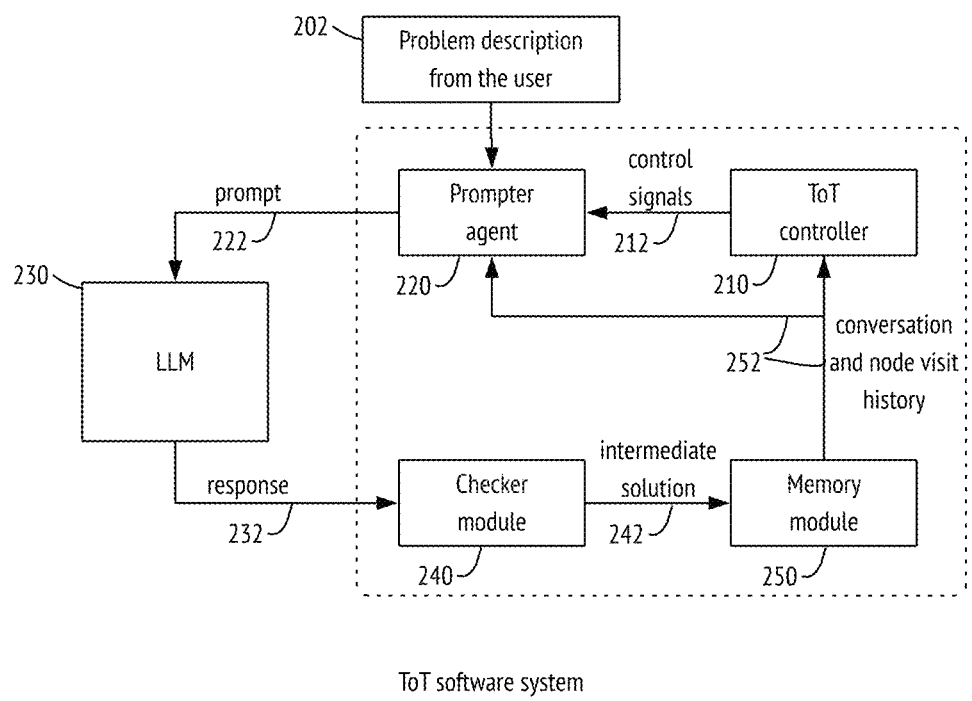
FIG. 2 depicts a ToT system that implements the ToT framework, in accordance with some embodiments of the present invention.

FIG. 2 depicts a ToT system that implements the ToT framework, in accordance with the disclosure. As mentioned earlier, embodiments of the disclosed systems can incorporate several components which enhance the problem-solving capability of the LLM 230, including a prompter agent 220, a checker module 240, a memory module 250, and a ToT controller 210.

In some respects, the problem-solving process can include a step where the user inputs the problem description 202. The prompter agent 220 then relays the problem to the LLM 230 in a prompt 222, which may include additional prompt text such as in-context examples. Based on the prompt 222, the LLM 230 outputs a response 232 that contains an intermediate solution (e.g., instead of trying to reach the full solution in a single attempt). After receiving the response 232 from the LLM 230, the checker module 240 is invoked to check the validity of the intermediate solution in the response 232. If it passes the correctness check, the intermediate solution 242 can be parsed and stored, along with the conversation and node visit history, in the memory module 250. If the correctness check is not passed, the conversation history and node visit history are still stored in the memory module 250. Based on the conversation and node history, the ToT controller 210 issues control signals 212 (e.g., backtrack or continue to search for the solution) to the prompter to either continue to search for the solution from the current node, or to backtrack to a previous node. If the intermediate solution 242 was correct, then the prompter agent 220 generates a new prompt 222 to encourage the LLM 230 to generate the next step, where the new prompt 222 is generated in part based on the content of the memory module 250, including the conversation and node history as shown in one prong of the information flow line 252. Conversely, if the LLM 230 generates an invalid intermediate solution, the ToT controller 210 will send control signals 212 to activate the prompter agent 220 to offer hints to the LLM and request it to consider again in the new prompt 222. In some respects, a valid intermediate solution may not always lead to the correct final solution. In order to prevent the system from getting stuck, the ToT controller 210 can monitor the search process by accessing the content of the memory module, including the conversation and node visit history, as shown in the other prong of the information flow line 252, and determine whether to continue trying from the current node or backtrack to a parent or an ancestor node and explore alternative directions.

The ToT strategy comprises a tree-search algorithm using an LLM as a heuristic for generating the search steps. In this setting, the LLM can be used for the "short-range reasoning" tasks, i.e., deriving the next intermediate solution, which is a type of tasks that have been shown to have a high success rate for LLMs. On the other hand, by introducing the checker module, the system can have a higher likelihood to discover the mistakes it makes as it generates the solutions. Moreover, by allowing the system to backtrack from a valid but somewhat "hopeless" intermediate solution, the system can explore a larger solution space, which enhances the "long-range reasoning" capability of the system as a whole. The ToT framework thus combines the best of both worlds. Furthermore, this multi-round conversation technique increases the number of computational steps the system can perform. Thus, based on the time-hierarchy theorem in computational complexity theory, the ToT framework can expand the range of problems that can potentially be solved compared to relying solely on a single round of conversation with an LLM.

Checker Module Embodiments

In various respects, the checker module can be rule-based or can be implemented as a deep neural network. For problems that have an explicit polynomial time algorithm for correctness checking (i.e., problems in NP), rule-based checkers can be implemented. Numerous important mathematical and logical problems are in this category, for example, equation solving, polynomial factoring, 3SAT, and puzzles like Sudoku. With a rule-based checker, the ToT system can be viewed as a hybrid system which allows explicitly encoding prior knowledge (e.g., the Sudoku rules) into a neural network powered system. An alternative is to train and use a neural network-based classifier as the checker. This can be useful for problems where a rule-based checker is difficult to implement, e.g., checking whether a mathematical proof is correct.

One exemplary embodiment of the checker module comprises an example implementation shown in Table 1, which is listed at the end of the present disclosure.

Memory Module Embodiments

The memory module may store an entire conversation history between the LLM and the prompter agent, as well as other supplemental data useful for problem-solving. The data stored can serve as the information source for the prompter agent to generate helpful hints for the LLM.

One exemplary embodiment of the memory module comprises an example implementation shown in Table 2, which is listed at the end of the present disclosure.

ToT Controller Embodiments

The ToT controller may oversee the entire ToT search. It can be implemented in a number of ways. In some embodiments, the ToT controller may be encoded with three simple rules: 1) if the checker module thinks the current partial solution is invalid, backtrack to the parent node, 2) if the current partial solution is valid, but the ToT search tree has explored C children of the current partial solution and yet failed to find the final solution, then backtrack to the parent node, and 3) if the current partial solution is valid and the ToT search tree has not explored C of its children, continue finding solutions from the current partial solution. Here, C is a pre-configured integer.

A more advanced version of the ToT controller can employ a policy network to determine the backtracking policy. The network's inputs include the recent search history comprising the sequence of the last k+1 nodes visited in the search tree $s_{i-k}, \ldots, s_{i-1}, s_i$, where k is a hyper-parameter and $s_i$ is the ith visited node in the search history. The network also takes in $c_i$ a Boolean variable which indicates whether the checker module considers the current node $s_i$ is valid. In some aspects, the system can sample from the policy to determine the next action $a_i$:

$$a_i \sim \pi'_p(a \mid c_i, s_i, \ldots, s_{i-k}), a \in A_{cand} \quad (1)$$

where $\pi_p^t$ represents the policy network of the ToT controller with parameters ρ. The set of candidate actions $A_{cand}$ includes simply staying at the current node to generate the next step, and backtracking to the parent or an ancestor node at most L levels up in the search tree where L is a hyper-parameter. Thus, the system can use one-hot encoding for the actions, where backtracking j levels up is represented by a vector where only the $j^{th}$ element is set to 1, and the remaining elements are set to 0. The action vector a and checker output $c_i$ are processed by a feed-forward network (FFN) for deep features extraction. A linear layer with learnable parameters $W_1$ and $b_1$ is added on top of the FFN to map its output to a vector $g(a, c_i)$. The last k+1 visited nodes are concatenated into a string, and then added with position embedding (PE), and finally inputted into a self-attention model. By adding position embedding, the attention model can make decisions based on the sequence of the recent node visits. A linear layer with learnable parameters $W_2$ and $b_2$ is added on top of the attention model to transform its output to a vector $g(s_{i-k}, \ldots, s_{i-1}, s_i)$ whose dimension matches with that of the vector $g(a, c_i)$. Finally, the system calculates the inner products of these two vectors, and uses the softmax function to compute the probability of each action candidate:

$$g(a, c_i) = W_1 \cdot FFN(a, c_i) + b_1 \quad (2)$$

$$g(s_i, \ldots, s_{i-k}) = W_2 \cdot \text{Attention}(PE(s_{i-k} \| .. \| s_{i-1} \| s_i)) + b_2$$

$$\pi'_p(a \mid c_i, s_i, \ldots, s_{i-k}) = \frac{\exp(g(a, c_i) \cdot g(s_i, \ldots, s_{i-k}))}{\sum_{a' \in A_{cand}} \exp(g(a', c_i) \cdot g(s_i, \ldots, s_{i-k}))}$$

In the above formula, "∥" is the string concatenation operator. The disclosure further discusses the training algorithm for the ToT controller policy network in the section "Controller and Prompter Training."

Prompter Embodiments

In some aspects, a prompter agent gives hints to the LLM for it to generate the next search step. One basic hint can be a generic prompt using the following template: generic_tmpl="For the given problem: [problem description], we have come up with a partial solution: [partial solution summary]. Please derive the next step on top of this partial solution, and return the next step in the following JSON format {next_step: <next step>}". Note that the template requires the LLM to respond with a structured string such as a structured JSON string. This can facilitate for the checker to extract the next solution step from the LLM response. To create an actual prompt from this template, the prompter needs the [problem description] and the [partial solution summary], both of which can be queried from the memory module.

Similar to the ToT controller, the prompter agent can also be implemented as a policy network, which can generate prompts based on the current partial solution and the conversation history. First, the prompt template can be defined as follows: prompt_tmpl=generic_tmpl∥"Here are a few examples: [in-context learning examples].", where ∥ is the string concatenation operator. The variable [in context learning examples] represents in-context learning examples for the problem being solved, which can be picked by the prompter policy network from a set of candidate examples. The rationale is that given the current and recently attempted intermediate solution, some in-context examples might work better than others as hints for the next step. Given the recently visited node sequence $s_{i-k}, \ldots, s_{i-1}, s_i$, our goal is to select/examples $e_i = \{e_i^1, e_i^2, \ldots, e_i^l | e_i^j \in E_{cand}\}$, where $E_{cand}$ is a pool of in-context learning example candidates. The examples can be selected according on a policy:

$$e_i^j \sim \pi_\theta^p(e \mid s_i, \ldots, s_{i-k}), \; e_i^j \in E_{cand} \text{ for } j = 1, 2, \ldots, l \quad (3)$$

$$h(e) = M_1 \cdot \text{Attention}(e) + c_1$$

$$h(s_i, \ldots, s_{i-k}) = M_2 \cdot \text{Attention}(PE(s_{i-k} \| \ldots \| s_{i-1} \| s_i)) + c_2$$

$$\pi_\theta^p(e \mid s_i, \ldots, s_{i-k}) = \frac{\exp(h(e) \cdot h(s_i, \ldots, s_{i-k}))}{\sum_{e' \in E_{cand}} \exp(h(e') \cdot h(s_i, \ldots, s_{i-k}))} \quad (4)$$

where $\pi_\theta^p$ represents the policy network of the prompter agent with parameters θ. With the set of selected examples, the prompter agent generates a prompt from the template: $p_i$=prompter(prompt_tmpl, $e_i$, $s_i$), which can be fed into the LLM to obtain the next intermediate solution $s_{i+1}$=LLM ($p_i$). The neural network architecture for the prompter's policy network may be similar to that of the ToT controller. One difference may be that since the in-context examples are expressed in natural language, an attention model is used to process them, rather than an FFN. The vectors h(e) and h($s_i, \ldots, s_{i-k}$) are computed by applying a linear layer with learnable parameters $M_1$, $c_1$, and $M_2$, $c_2$ respectively, to the outputs of the Attention model with inputs e and a position embedding of the last k+1 visited nodes, respectively. The inner products of these two vectors are calculated, and the softmax function is used to compute the probability of each in-context example to be used in the prompt.

The prompter policy network can be trained together with the ToT controller using multi-agent reinforcement learning methods. The training algorithm of the prompter's policy network is discussed further below.

Controller and Prompter Training

In the previous sections, the disclosure described a multi-agent ToT framework. This section describes methods of training the agents, in particular, the policy networks of the ToT controller and the prompter agent. In addition to a variety of multi-agent reinforcement learning algorithms (MARL), a relatively simple approach, which uses a modified version of the REINFORCE algorithm, can be used to train the policy networks of the ToT controller and the prompter agent directly.

A run of the ToT system can be defined as the process where a user inputs the problem description, and the ToT system attempts to solve the problem until it thinks the problem is solved, or a pre-specified maximum round of conversations is reached. Next, the reward r of a run may be set according to the rules: if the problem is correctly solved, then r=+1; otherwise, if the system outputs an incorrect solution, or the maximum round of conversations is reached, then r=−1.

A policy gradient based training algorithm for the ToT system is provided in Algorithm 1 as shown in FIG. 3. In step 302 (Lines 1-2), the algorithm takes two inputs, the training data set $P_{train}$, and the number of training epochs N. In step 304 (Lines 3-4) The two policy networks $\pi_\rho^r(a_i | s_i, \ldots, s_{i-k})$ and $\pi_\theta^p(e_i | s_i, \ldots, s_{i-k})$ are randomly initialized. In step 306 (Line 6), the two policy networks are trained in turns, i.e., one network is trained with policy gradient while the other is kept, then vice versa. To be more specific, in one embodiment, when the current epoch is an even number, we update the ToT controller policy $\pi_\rho^r$, and keep the parameters of the prompter agent fixed. Otherwise, we update the prompter agent policy $\pi_\theta^r$ and fix the ToT controller policy. Next, in Steps 308, 310, and 312 (Lines 7-9), the algorithm updates the parameters of the selected policy network using the policy gradient method. For each problem in the training data, the system attempts to solve it with a ToT system run. In Step 310 (Line 8), based on the result of the ToT system run, the reward for that run is obtained. In step 312 (Line 9), the weights w of the current policy being updated are then updated using the policy gradient update. The entire training algorithm runs for N epochs.

Problem-Solving Algorithm

After the ToT system is trained, it can be used for inference, i.e. problem-solving. As shown in FIG. 4, Algorithm 2 provides the pseudo code for solving problems using the ToT system. In step 402 (Lines 1-2) the algorithm starts with a user inputting description of the problem and a parameter K, the maximum number of conversation rounds. In step 404 (Line 3), the prompter module then converts the user input into a prompt using a prompt template for user input, for example: user_input_prompt="For the given problem: [problem description], please derive the first step, and return the step in the following JSON format {next_step: <next_step>}".

Next, in step 406 (Line 4) up to K rounds of conversations with the LLM are conducted for problem-solving. In each round, in step 408 (Line 5), the LLM first produces a response for the given prompt. Then, in step 410 (Line 6) the checker analyzes the response, and returns a result. The result contains the partial solution extracted from the LLM response, as well as information comprising whether the checker considers the solution as a valid final solution, a valid intermediate solution, an invalid partial solution, or other classifications. In step 412 (Lines 7-9), if the solution is a valid final solution, the algorithm simply returns it. Otherwise, the result is stored in the memory module in step 414 (Line 10). Based on the content of the memory module, the ToT controller issues control signals, e.g., backtracking by l levels, to the prompter in step 416 (Line 11). Finally, based on the control signal, the prompter looks up the relevant information from the memory module, and produces the next prompt for the LLM in step 418 (Line 12). If no valid final solution is found within K rounds of conversations, the algorithm returns nil indicating it fails to solve the problem in step 420 (Line 14).

System Evaluation and Sudoku Embodiment

An evaluation methodology and experimental results for the ToT system including the ToT framework are described and results are shown in reference to FIG. 5, discussed further below. The evaluation focuses on the ToT-based solver for the Sudoku problem. At the first glance, Sudoku problems may appear as brain teasers with little practical importance. However, the generalized Sudoku problem on $n^2 \times n^2$ grids of n×n blocks is known to be NP-complete. If the ToT framework can solve instances of the generalized Sudoku problem (granted that it might take an exponential number of rounds of conversations), in principle it can handle many other mathematical and logical reasoning tasks. In fact, it is straightforward to re-purpose the implementation described below to solve other puzzles, such as 3SAT, 3-coloring, etc. Below the disclosure first describes the implementation details of the solver. Then, the disclosure presents the test suite used in our evaluation, as well as the experimental results.

The ToT-based Sudoku solver follows the generic framework described in Section 3 with some specific tweaks for the Sudoku problem. It allows a user to input a Sudoku puzzle using natural languages, for example: "Please solve this 4×4 Sudoku puzzle [[3,*,*,2],[1,*,3,*],[*,1,*,3],[4,*,*, 1]] where * represents a cell to be filled."

In an example embodiment, the ToT-based Sudoku solver is implemented in Python. In some embodiments, a rule-based approach for the checker module is adopted since the Sudoku rules are precise and easy to check. The memory module stores the conversation history between the prompter and the LLM, as well as a search tree which maintains all the partially filled Sudoku boards the LLM has generated so far. This way, when backtracking happens, the previous board configuration can be retrieved. In this example embodiment, the ToT controller is also rule-based. It returns to the parent node in the search tree if either the current node is considered invalid by the checker, or the search algorithm has explored more than 5 children of the current node. Finally, the prompter agent uses a variation of the generic template mentioned above, with the [problem description] being the initial configuration of the Sudoku board input by the user, and [partial solution summary] being the partially filled board represented by the current node in the search tree. The LLM utilized in this example embodiment is the "gpt-3.5-turbo" model, which is accessible through the OPENAI API suite, and the temperature parameter is set to 1.

Figure 5:
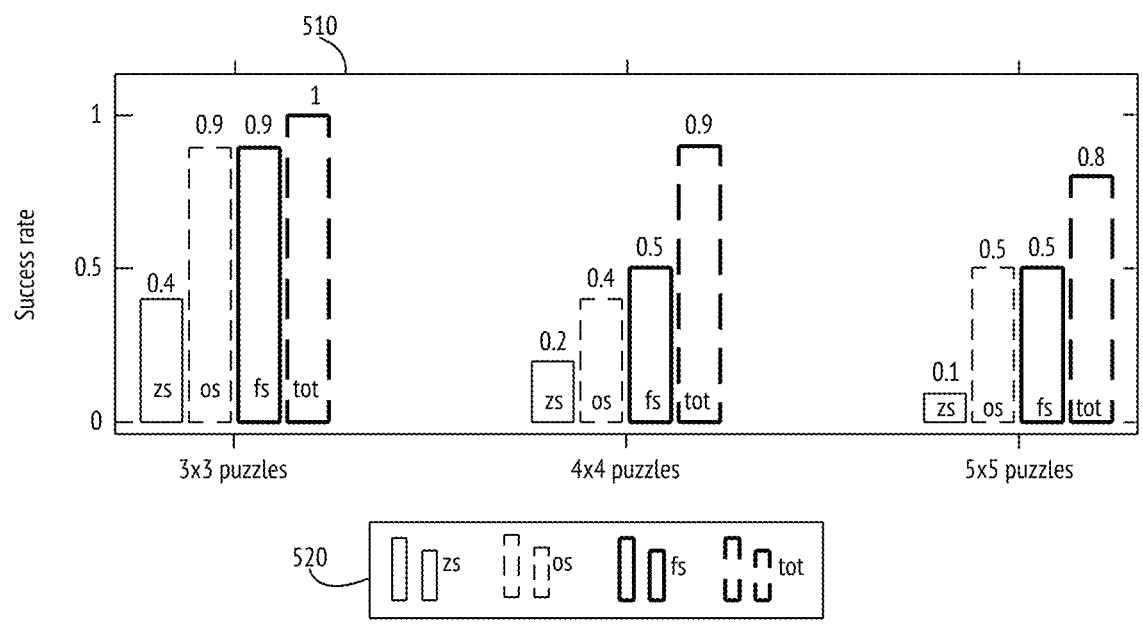
FIG. 5 is a plot comparing the success rates of different LLM-based solvers across three benchmarks, in accordance with some embodiments of the present invention.

In an illustrative example, four LLM-based Sudoku puzzle solvers are implemented and their performance is compared, as shown in the plot in FIG. 5. The four solvers, which are shown in legend 520: 1) a zero-shot solver (zs) which directly posts the puzzle description to the LLM, 2) a one-shot solver (os) which provides a chain-of-thought (CoT)-style step-by-step solution of a 3×3 Sudoku puzzle as an example in addition to the problem description, 3) a few-shot solver (fs) which provides multiple examples with CoT-style solutions, and 4) one embodiment of a Tree-of-Thought solver as described above. Three benchmarks are used, comprising ten 3×3, 4×4, and 5×5 Sudoku puzzles, respectively. The objective of a solver is to fill the n×n Sudoku grid with digits so that each row and column contain all of the digits from 1 to n (n=3, 4, 5 in this illustrative example).

FIG. 5 compares the success rates of the four different LLM-based solvers across the three benchmarks of the illustrative example in the bar plot 510. The success rate is plotted, where "success rate" refers to the fraction of problems in a benchmark set that are successfully solved by a solver. For example, if a solver is able to solve 4 out of 10 problems in the "3×3 puzzles" benchmark set, then the success rate of this solver for this benchmark set is 0.4. As expected, the zero-shot solver (zs) has the worst performance across all the three sets of benchmarks. Adding CoT-style step-by-step examples significantly boosts the success rate as seen with the one-shot solver (os) and few-shot solver (fs), especially for the 3×3 puzzles. This is expected, since one can effectively rely on "short-range" reasoning skills, which is a strength of the LLM models, to solve a small-sized 3×3 Sudoku puzzle, especially when CoT-style hints are provided. However, as the puzzle size gets bigger, the success rate of the one-shot solver (os) and the few-shot solver (fs) dropped to around 0.5. This is because solving bigger puzzles requires trial and error, which is a capability LLMs generally lack as discussed earlier.

In comparison, the exemplary ToT-based solver demonstrates superior performance when compared to the other solvers. For the 3×3 benchmark set, it was able to solve all the puzzles. The success rate improves by 11% compared to the second best for the two benchmark sets. For the 4×4 benchmark set, the exemplary ToT-based solver failed to find the solution for 1 out of the 10 puzzles before reaching the maximum round of conversations (which is set to 100 in our experiments). This may be due to the limited capability of the rule-based ToT controller. In particular, the rule-based controller may not have information about whether the current partially-filled board can be completed without violating the Sudoku rules, which decreases the efficiency of the solution search. In some embodiments, a neural network based ToT controller may perform better. Despite this, the success rate of the exemplary ToT based solver is still 80% higher compared to that of the one-shot (os) and few-shot (fs) based solvers. Finally, for the 5×5 puzzles, the exemplary ToT-based solver failed with 2 puzzles before reaching the maximum round of conversations. Nonetheless, the success rate is 60% higher compared to that of the one-shot and few-shot based solvers.

Exemplary Flow of Operations

Figure 6:
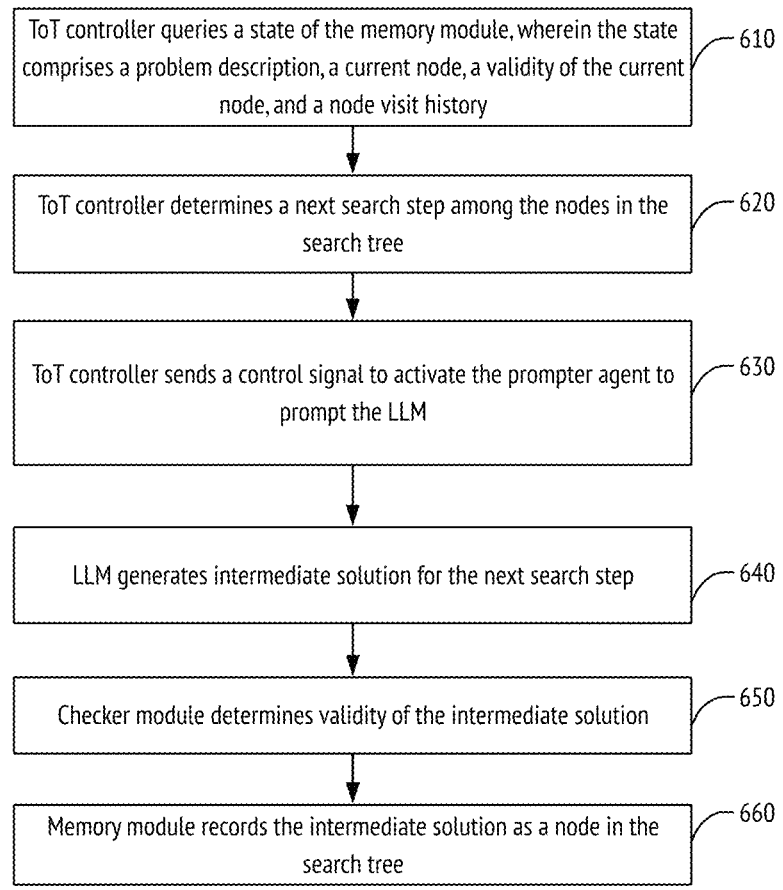
FIG. 6 shows an example flowchart diagram for solving problems with the LLM-based ToT solver.

FIG. 6 shows an example flowchart diagram for solving problems with the LLM-based ToT solver. In step 610, the ToT controller queries a state of the memory module, where the state comprises a problem description, a current node, a validity of the current node, and a node visit history. In step 620, the ToT controller determines a next search step among the nodes in the search tree. In step 630, the ToT controller sends a control signal to activate the prompter agent to prompt the LLM. In step 640, the LLM generates an intermediate solution for the next search step. In step 650, the checker module determines the validity of the intermediate solution. In step 660, the memory module records the intermediate solution as a node in the search tree.

Further Embodiments

In this disclosure, the Tree-of-Thought framework is described, which enhances LLMs with additional control and prompter agents, and checker and memory modules, resulting in improved performance for mathematical problem-solving tasks and other problem-solving tasks. To evaluate the performance of this technique, an exemplary Sudoku puzzle solver based on the ToT framework was disclosed. The system can utilize a rule-based checker that contains custom logic, which may, in some situations, make the system less easily adaptable to other problems. For more generic problems, for example, general mathematical and logical reasoning problems, where rule-based solution checking is difficult to implement, the checkers can be based on neural networks or other probabilistic models. In other aspects, a neural network based ToT controller may enhance the system performance. Additionally, the policy-gradient based training algorithm described may be relatively simple and may be susceptible to training stability issues. To further optimize the ToT system, more advanced multi-agent reinforcement learning algorithms, particularly those designed for cooperative agents, can be included.

In other aspects, the framework can comprise a "self-play" technique to enable the ToT system to develop novel problem-solving strategies that are not found in the LLM's training text corpus. The self-play training method can include a reinforcement learning technique which was popularized by the development of competitive game-playing agents where an AI agent learns to improve its own strategy by playing against itself. Some LLMs are typically trained using self-supervised learning techniques. They may have limitations when it comes to problem-solving, as they may not be able to generate samples (i.e. novel problem-solving strategies) that fall outside the distribution of the training data. In other words, they may not be able to "think outside the box", which can be a crucial human trait that facilitates the discovery of new knowledge. Compared to self-supervised learning, self-play-based reinforcement learning enables the system to access a much broader solution space beyond the provided training examples, allowing for greater improvement. AlphaGo and similar systems have demonstrated the ability to devise strategies that surpass those of human experts. For ToT system training, instead of relying on the training data set $P_{train}$, the system can use a "quizzer" module which can come up with problem descriptions on its own to train the ToT controller and the prompter agent. An enabler for training some systems can be that the environment reward can be precisely determined, as it is straightforward to determine whether the gameplay results in a win or a loss. In various aspects, the system including the ToT framework can incorporate a checker that can assess the correctness of the solution, functioning similarly to the environment, particularly for problems that have well-defined solution validation rules. Thus, the reinforcement learning training methods can be readily applied. The self-driven learning approach, similar to the self-play method, can be an effective means of improving the ToT framework's problem-solving capabilities beyond the solution examples provided in the training text corpus for the LLMs.

Some embodiments of a system comprising a hardware processor, a non-transitory storage medium, and computational modules comprising a prompter agent, a checker module, a memory module, and a ToT controller are described. The non-transitory storage medium comprises program code to receive a problem, engage the computational modules in a problem-solving process comprising a multi-round conversation with an LLM, record the multi-round conversation and state history associated with the problem-solving process on the memory module to determine a first outcome, and then, responsive to the first outcome, potentially backtrack to a previous step of the problem-solving process to determine a second outcome.

In some embodiments, the problem-solving system comprises a ToT controller, wherein the ToT controller uses one or more large language models (LLMs) to derive one or more partial solutions to a problem, and wherein the ToT controller is capable of backtracking to a previously derived partial solution.

In some embodiments, the problem-solving system further comprises a blockchain comprising one or more blockchain nodes, wherein a blockchain node runs one instance of the one or more LLMs. In other embodiments, the problem-solving system further comprises a blockchain comprising one or more blockchain nodes, wherein a blockchain node runs a ToT controller task.

In some embodiments, the memory module and the checker module may be integrated with the ToT controller. For example, the memory module and the checker module can provide methods that can be called by the ToT controller to update the current state, and validate the partial solution.

Blockchain-Supported Edge Computing Network

In various aspects, the disclosed systems and architectures can be used to integrate built-in artificial intelligence and/or large language model (LLM) functions into the blockchain, such as the THETA edge network supported by the THETA blockchain. Some machine learning (ML) tasks like classification, regression, text completion, and the like can be completed on the THETA Blockchain. In some aspects, users can call these AI functions through smart contracts. In other respects, the disclosed systems can allow users to contribute their device's computational resources to train and power GPT-like applications, and can earn tokens accordingly which in turn can be used to make their own queries, and get answers.

Accordingly, distributed embodiments of the architecture of FIG. 2 may be configured over a blockchain-supported edge network, where multiple instances of the LLM are run by different edge nodes in parallel or in series, or where the various modules described (e.g., controller, prompter, memory and checker.) are run by different edge nodes in parallel or in series.

Overview of Blockchain Technology

In some embodiments, the present invention relates to methods and systems for an incentivized and decentralized peer-to-peer network for bandwidth, data, and/or computational resource sharing. More specifically, embodiments of the present invention are directed to an incentivized and decentralized computing network or platform (hereafter the "THETA edge computing platform", "THETA edge computing network", "THETA edge network", or "THETA network") in which peer-to-peer (P2P) computational resource sharing is facilitated through smart contracts on a blockchain (hereafter the "THETA blockchain") maintained by a blockchain network (hereafter the "THETA blockchain network"). In various embodiments, a smart contract-based infrastructure implements functionalities including task assignment, data distribution, solution verification, reward pooling, and incentive micropayments. That is, peer edge nodes in the THETA network invoke, via blockchain nodes, decentralized applications (DApps) in the form of smart contracts on the THETA blockchain to share redundant or unused processing power, to function as "edge computing nodes" or "edge workers", to support other peer nodes' computational demands by exploiting otherwise wasted idle CPU cycles, and to automatically receive rewards for the work done for other peer nodes.

A peer-to-peer mesh network can allow interconnected peer nodes to share resources with each other without the use of a centralized managing server or stable host. The THETA network, as described in issued U.S. Pat. No. 10,771,524 (Methods and Systems for a Decentralized Data Streaming and Delivery Network, incorporated by reference in its entirety herein), enables the sharing of bandwidth by edge cacher nodes, to cache and relay video and other data, in a network infrastructure that is scalable to millions of concurrent users through native THETA blockchain protocol-level support for cryptocurrency micropayments. As bandwidth sharing utilizes minimal Central Processing Unit (CPU) and Graphical Processing Unit (GPU) resources, the present disclosure provides an additional framework to enable edge nodes to distributively perform computationally intensive tasks such as video transcoding and drug design and discovery-related computations.

In one aspect, embodiments of the present invention establish a self-organized and dynamic universal edge computing platform including task initiator nodes and edge computing nodes that interact directly with each other and with smart contracts hosted by the THETA blockchain. The THETA blockchain includes a decentralized public ledger system that builds upon a multi-level Byzantine Fault Tolerant (BFT), Proof-of-Stake consensus mechanism carried out by a small number of validator nodes and a large number of guardian nodes in the THETA blockchain network. The THETA blockchain can provide native protocol level support for resource-oriented micropayment pools and smart contracts for computation task management and solution verification. A smart contract can include a self-executing contract or self-enforcing agreement in the form of computer programming codes or instructions managed by and stored on a blockchain. A smart contract represents a decentralized application that is executed based on predetermined conditions or based on an agreement between participating parties. In various embodiments of the present invention, one or more smart contracts may be called or triggered to register computation tasks from task initiators, to verify solutions received from edge computing nodes, and to distribute token awards from a reward pool to edge computing nodes once solutions are verified. Depending on its size and/or format, the disclosed systems can verify a solution on-chain through a verifier smart contract, or off-chain through the original task initiator.

The THETA decentralized computing platform's decentralized nature and low barrier to deployment allow peers to use the system for computation tasks of both large and small scales, without the need for specialized project servers for task allocation and management. For example, individual users who do not own professional software on powerful enough personal computers can put up simple image rendering tasks for individual edge workers, developers can tap into the system to delegate computation intensive tasks such as machine learning model training and evaluation to hundreds of edge workers, gaming and video streaming platforms that already have millions of concurrently active users can distribute rendering and transcoding jobs among its own users seamlessly, and large-scale scientific projects such as SETI@home and Folding@home are inherently compatible with the THETA platform.

Furthermore, as edge computing nodes can be automatically awarded and incentivized for their work, participants in the THETA edge computing network may be more likely to provide significant contributions in a reliable manner when compared to existing crowd-sourcing donation platforms that run on volunteer computers, with many more edge computing nodes willing to participate. Additional protection against malicious task initiators can further be provided by the smart contracts via collateral locking and reputation ranking.

In short, the THETA decentralized edge computing platform combines the advantages of P2P distributed computing techniques and blockchain-based smart contracts to achieve high scalability and high resource availability, and attains the following characteristics:

Organic network growth over full decentralization: the THETA network is self-organizing, self-adaptive, self-evolving, highly available, scalable, and robust, with minimal operational overhead, and with plug and play capabilities where a peer node (e.g., a task initiator or an edge worker) can join or leave at any time;

Incentivization to encourage the abundance and diversity of computation resources: the THETA network provides blockchain and smart-contract supported incentivization for task completion, with high transaction-throughput micropayments enabled; and Universality: the THETA network can support a wide range of computational tasks with configurable task metadata and/or parameters on input/output data size and format, solution accuracy, precision, and computation delay etc., and further with options for task batching and subdivision.

In what follows, a THETA decentralized edge computing platform and infrastructure are disclosed, software architecture of individual nodes within the THETA network are presented, and designs for the THETA blockchain ledger system and smart contracts are also disclosed.

Peer-to-Peer Decentralized Computing Network

In some decentralized computing projects, individual nodes or users are connected to a central server directly to obtain allocation and assignment of computation tasks. In some cases, individual users in a local area network may function as a worker farm to solve tasks from a central server. By comparison, nodes within a peer-to-peer (P2P) distributed computing network communicate directly with each other, without the need of a central server. One advantage of P2P resource sharing is availability and robustness. Peers can come and go at any time, and tasks can be batched or subdivided depending on resource availability.

Figure 7:
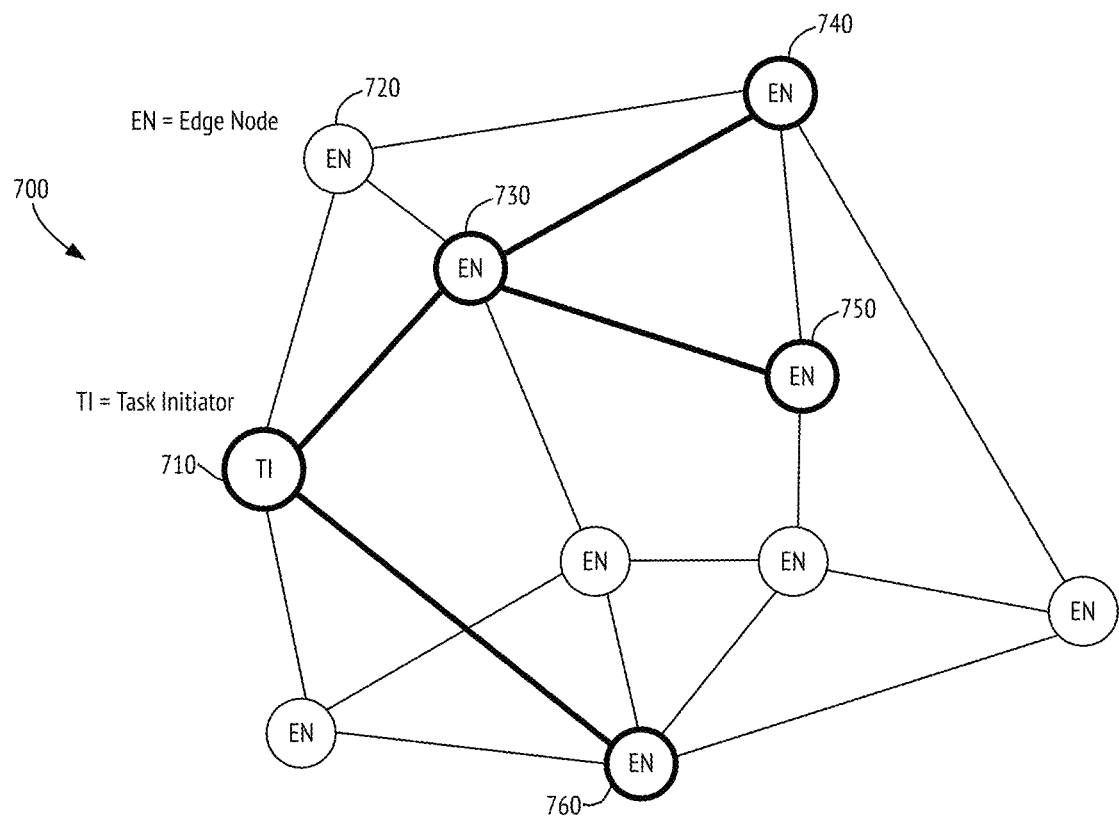
FIG. 7 is an illustrative network diagram showing a peer-to-peer network architecture for decentralized computing, according to one embodiment of the present invention.

FIG. 7 shows a diagram for at least a portion of an illustrative peer-to-peer network architecture for a THETA decentralized edge computing platform 700, according to one embodiment of the present invention. In particular, THETA network 700 may include multiple edge nodes ("EN") connected via P2P connections, including one or more task initiators ("TI") such as 710, and one or more edge workers or edge computing nodes such as 730, 740, 750, and 760. In various embodiments, edge nodes in THETA network 700 may use any peer discovery techniques to self-organize into a semi-randomly connected peer-to-peer network based on one or more parameters, including, but not limited to, network distance, geo-locations, and/or other system specification and availabilities. Exemplary peer-discovery techniques include but are not limited to, distributed hash tables, use of tracker servers, Domain Name System (DNS) query-based initial peer list bootstrapping, combinations thereof, and/or the like.

In the present disclosure, "edge nodes" and "edge computing nodes" refer to individual peer nodes in the THETA network. As previously discussed, the THETA network may implement edgecast functionalities for data and bandwidth resource sharing, as well as edge compute functionalities for computation resource sharing. Thus, an edge node may be implemented to function as one or more of an edge cacher, a viewer, a task initiator, or an edge worker. An edge cacher node shares its storage and bandwidth resources with other peers; a viewer node downloads data from edge cacher nodes; a "task initiator" or "task server" node uses the THETA network to solve its computational tasks; while an "edge worker" or "edge computing node" is a generic computational platform or generic end user client that shares and contributes its processing power and CPU time to solve computational tasks registered by task initiators in exchange for rewards. In what follows, unless otherwise specified, the terms "edge node", "edge computing node", and "edge worker" may be used interchangeably, with the understanding that an edge node can implement one or more protocols to share with others, or receive from others, one or more types of resources. Similarly, unless otherwise specified, the terms "THETA network", "THETA decentralized network", "THETA edge computing platform", "THETA edge computing network", "THETA edge network", and "THETA EdgeCast network" are used interchangeably, with the understanding that the THETA network is designed for the universal sharing of different types of resources among its member peer nodes.

In some embodiments, an edge computing node such as 730 in FIG. 7 is a generic computational platform that hosts various software including a solver for tasks issued by task initiator 710. In some embodiments, dedicated programming instructions, add-ons, plugins, or software packages, and/or standalone software applications may be provided to edge worker 710 by the THETA platform for use in solving one or more tasks. In some embodiments, a user client module, a library, or a software development kit (SDK) may be provided, integrated directly into, and interface with edge compute node 730's existing computing environments and/or installed proprietary software to solve different types of computation tasks.

Once a task is solved by edge computing node 730, the edge computing node may upload the solution directly to task initiator 710, or indirectly through another intermediate node or network, and in turn be rewarded once the solution has been verified. In some embodiments, each edge computing node may have one or more associated availability scores indicating its up time, response time, its "skill level" or hardware specification (e.g., processor number, speed, memory size, bandwidth, memory storage, combinations thereof, and/or the like), and other characteristics such as computation history. Such availability scores may be used for task/job matching, or task allocation and assignment by task initiators.

Task initiators are users or user computers that utilize the THETA edge computing platform to solve their computational tasks. In the exemplary setup shown in FIG. 7, edge nodes that are actively participating in edge computing for task initiator 710 are shaded in color. Task initiator 710 posts tasks, edge computing nodes 730 and 760 download and solve such tasks, and edge computing node 730 may further distribute computation sub-tasks to other peers 740 and 750. Task initiator 710 may register tasks on the THETA blockchain and provide rewards to edge workers, including 730 and 760, who complete the tasks. A reward may be in the form of a cryptocurrency token such as a THETA token, a THETA FUEL (TFUEL) gas token, any other token/cryptocurrency, or any form of an IOU that may be redeemable at a later time. In some embodiments, a task initiator may have one or more associated scores indicating its task load, priority, urgency, delay requirement, reward amount and history, trustworthiness, and similar characteristics. Such scores may be used for node/task/job matching, task allocation and assignment, and/or tier-ed rewarding strategies and payment pool creation and management. In some embodiments, a task initiator may include local computation modules for verifying the quality of a solution, for example, using measures for correctness, accuracy, error residual, confidence levels, and the like, depending on the nature of the original computation task.

In what follows, both task initiators and edge computing nodes are discussed in exemplary embodiments, for illustrative purpose only, without limiting the scope of the methods, systems, and devices as disclosed herein, which are capable of distributing or performing computation tasks with various latency, accuracy, or precision requirements. "Computation", "computation task", "computational task", or simply "task" refers to any computer-executed processes that use multiple CPU cycles to execute a given set of computation instructions, to convert a set of input data into a set of output data, and/or to compute a "solution" to a proposed or registered problem. Exemplary computation tasks include, but are not limited to, any one or combination of data cleaning, search, comparison, sampling, interpolation, extrapolation, transformation, transcoding, equation solving, statistical analysis, numerical modeling, and machine model training and validation. A solution to a task may take on different alphanumerical formats and sizes depending on the nature of the task, and a solution verification process may check whether the solution meets one or more given conditions or requirements. For example, an integer factorization task may result in a unique deterministic result in the form of numerical tuples that can be multiplied together to verify its correctness. On the other hand, a video transcoding task may have multiple video output files as the solution, each with a different resolution. Each video file may be sampled to verify its resolution meets an initial requirement of the task, while being a non-unique output file at that particular resolution, depending on the transcoding technique used. Some tasks may be batched together, while some may be subdivided. For example, an edge computing node such as 730 in FIG. 7 may further distribute computation sub-tasks to its peers 740 and 750, and each of edge computing nodes 730, 740, and 750 may be rewarded proportionally for its participation in completing a computation task as originally proposed by task initiator 710, once a solution or sub-solution is verified.

Moreover, a task initiator or an edge computing node may receive, store, and transmit chunks, fragments, slices, or batches of input data, output data, data hashes, problem stems, and/or task metadata, and may support "range requests" to avoid the need to download or upload a relatively large chunk of data when only a relatively small fraction is needed.

As discussed, although individual nodes are labeled as either a task initiator or an edge computing node in FIG. 7, in some embodiments, a peer node in the THETA network may be configured to function as both a task initiator and an edge computing node. For example, edge computing node 730 may poll several task initiators including task initiator 710 for tasks to solve, and itself may also be polled by edge computing nodes 740 and 750 for tasks or subtasks to solve, depending on the priority, urgency, difficulty level of the problem, and the amount of reward offered. In another example, edge nodes 740 and 750 may exchange computation resources, where each node uses a software that the other node does not have to complete a task for the other node.

Figure 8:
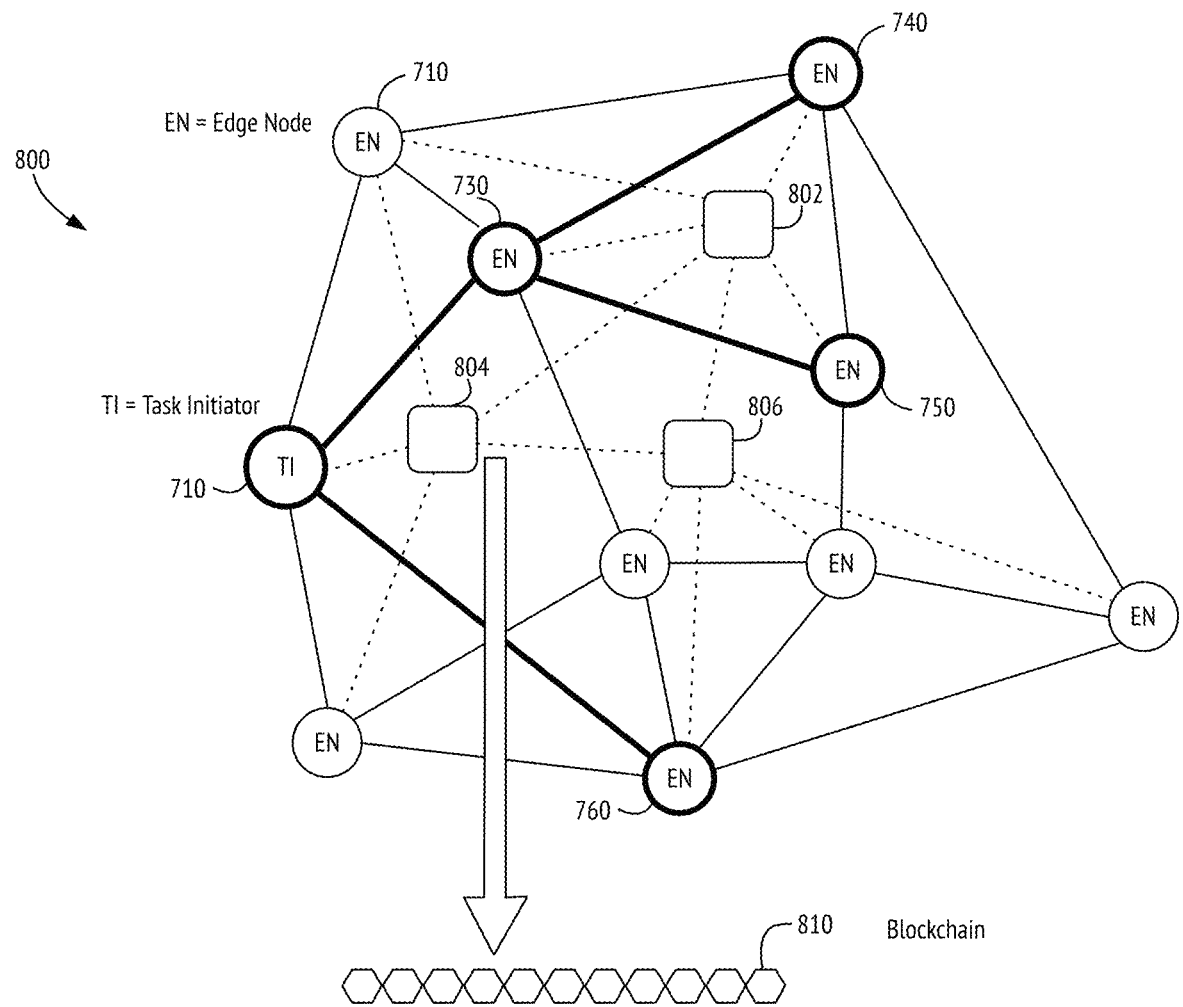
FIG. 8 is an illustrative network diagram showing the decentralized edge computing platform supported by a smart contract-enabled blockchain, according to one embodiment of the present invention.

To facilitate task allocation, assignment, solution generation, verification and rewarding, a THETA blockchain network may provide native protocol level support for reward pools and smart contracts. FIG. 8 is an illustrative network diagram showing the decentralized edge computing platform 800, which is expanded from the edge computing platform 700 in FIG. 7, and which is supported by a smart contract-enabled blockchain 810, according to one embodiment of the present invention. A blockchain such as 810 can include a list of public transaction records, or blocks, linked through cryptography, and typically managed by a blockchain peer-to-peer network, as illustrated by blockchain nodes 802, 804, and 806. Each edge node in the THETA decentralized network is connected to at least one blockchain node in FIG. 8. In some embodiments, edge nodes may function as blockchain nodes and may participate in transaction verification, block assembly, and smart contract execution as well. In some embodiments, edge nodes may be rewarded for being up and running within the THETA network.

While some payment systems may use a central authority to verify and clear transactions to maintain trust, a blockchain ledger can achieve global, decentralized consensus without such a central authority. The THETA blockchain uses a Proof-of-Stake (POS) distributed consensus approach, where a blockchain node may mine or validate a block according to various combinations of random selection, wealth and/or age (i.e., the "stake"). For example, a stake may be a fixed amount of cryptocurrency funds (e.g., THETA tokens) that is committed to the blockchain by a miner in order to participate in block creation and validation. The more stake a miner commits, the more mining power it may have. In various embodiments, other types of block consensus mechanisms such as Proof-of-Work, Proof-of-Engagement may be used instead. Furthermore, smart contracts are immutable computer programs executed and run deterministically on blockchain nodes. Once deployed, a smart contract can be executed but cannot be changed. Each edge node in the THETA decentralized network may access smart contracts deployed on blockchain 810 to participate in distributed computing as disclosed herein.

Figure 9:
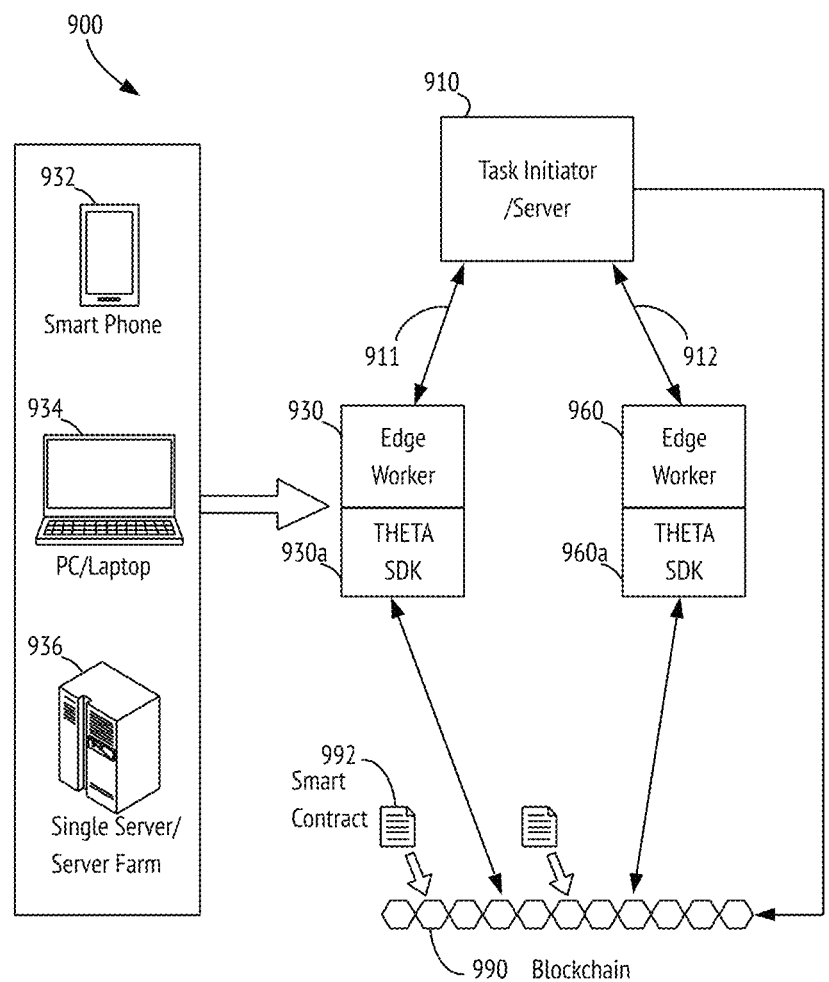
FIG. 9 is an illustrative architecture diagram showing part of a blockchain and smart contract-supported decentralized edge computing platform, according to one embodiment of the present invention.

FIG. 9 is an illustrative architecture diagram showing part of a blockchain and smart contract-supported decentralized edge computing platform 900, according to one embodiment of the present invention. In this illustrative example, task initiator or task server 910 is connected to edge worker nodes 930 and 960 through P2P connections 911 and 912 respectively. In one exemplary embodiment, task initiator 910 may be a peer edge node, such as when one peer relies on another peer for the transcoding of video data. In another exemplary embodiment, task initiator 910 may be an institutional server cluster from large projects such as SETI@home, FightAids@home, or Folding@home.

In various embodiments, each component or node within THETA network 900 may be implemented as different types of computing clients or modules, such as stand-alone edge computing clients, WebApps, SDKs, and the like. For example, edge node 930 may be implemented as a dedicated software module that runs on any suitable device including, but not limited to, mobile computing devices such as tablets or smartphones 932, personal computers or desktops 934, game consoles, and server machines 936. Other examples of suitable computing entities are provided with reference to FIGS. 15 and 16. Edge node 930 may offer a portion or all its local idle computational power for sharing, with the actual amount of computational resource needed by a requested task configured dynamically. Here computational power or computational resource may refer to any generic or specialized processors or accelerators, CPU or GPU cycles, cores, threads, transient or non-transient storages, data bus usages, or the like, that may be used for the completion of a computing task. In some embodiments, edge nodes 930 and 960 may include different types of edge computing software or clients capable of processing different task types with different difficulty levels, limitations, constraints, conditions, priorities, urgencies, or other similar characteristics. In some embodiments, each of edge nodes 930 and 960 may implement an end-user software using a THETA Software Development Kit (SDK) such as 930a and 960a, so that an edge computing node may utilize pre-existing task solving software or computing environments. That is, the THETA SDK may be integrated into a third-party application or device so that a task may be solved through the third-party application when necessary. An SDK is a set of software development tools or programming packages for creating applications for a specific platform. An SDK may be compiled as part of the developed application to provide dedicated interfaces and functionalities. Alternatively, an SDK may be an individually compiled module, incorporable into an existing application or computing environment as a plug-in, add-on, or extension in order to add specific features to the application without accessing its source code.

As discussed previously, task initiator nodes and edge computing nodes may utilize any peer discovery methods to self-organize into semi-randomly connected networks based on node specifications, bandwidth availability and cost, network distance/geo-distance, and/or other factors. For example, each edge computing node such as 930 and 960 in FIG. 9 may have one or more associated availability scores, indicating its up time, response time, its "skill level" or hardware spec and/or capabilities, and other characteristics such as computation history and reliability. Each task initiator such as 910 in FIG. 9 may have one or more associated scores as well, indicating its task load, priority, urgency, delay requirement, reward amount and history, trustworthiness, and similar characteristics. Such scores may be used for node/task/job matching, and/or task allocation and assignment, and/or tier-ed rewarding strategies and payment pool creation and management. In some embodiments, network or geo-distances may be estimated and edge nodes within a certain threshold distance may be selected for P2P resource sharing. For example, task initiator 910 may utilize the connectivity between IP addresses collected in the past to analyze and select candidate edge computing nodes. In some embodiments, peer selection and task assignments are made independent of the distance between nodes, especially with tasks that can tolerate high computation and transmission delays.

In some embodiments, edge computing nodes with specs above a certain threshold may be made available for particular task initiators known to host difficult tasks that require more than a threshold number of parallel processors, a threshold number of CPU cycles, with specific needs on local storage or computation delay, with additional requirements on solution precision, or the like. In some embodiments, some task initiators and/or edge computing nodes may be partitioned into clusters, for example, based on task type, and to share rewards from the same reward pool. In some embodiments, edge computing nodes are not partitioned into clusters, to improve robustness of the network at least because the network may continue to function if any task initiator or edge computing node leaves the network. As more edge nodes are added to the network, the network may become more efficient and may achieve higher computation offload. In some embodiments such as shown in FIG. 9, edge nodes 930 and 960 may connect directly with task initiator server 910, which may keep track of active edge computing nodes. For example, an active edge computing node 930 may maintain a socket connection with task server 910 and send heartbeat signals consistently. If task initiator server 910 does not receive a heartbeat for a certain amount of time, it may consider that peer node 930 as having left the network.

To facilitate task registration, solution, verification, and rewarding, each of task initiator 910 and edge computing nodes 930 and 960 may have direct access to a THETA blockchain 990 that hosts one or more smart contracts such as 992. A blockchain can include a list of public transaction records, which are data structures that encode the transfer of value from one user to another. Transactions can be structured and bundled into blocks (e.g., through a Merkle tree), and blocks are chained through cryptography, and in turn managed by a blockchain peer-to-peer network with protocols for inter-node communication and block validations, to achieve global, decentralized consensus without a central authority. A smart contract is a decentralized application stored and run on a blockchain. When a transaction has a smart contract address as a destination, the smart contract is executed and a function as specified by the transaction is called. In embodiments of the present invention, one or more smart contracts deployed on the THETA blockchain may be invoked, called, or triggered to register computation tasks from task initiators, to verify solutions received from edge computing nodes, and to distribute token awards from a reward pool to edge computing nodes once solutions are verified. Depending on its size and/or format, a solution may be verified on-chain through a verifier smart contract, or off-chain by the original task initiator. More details on the THETA blockchain are provided in the next section.

In summary, the THETA decentralized edge computing platform includes three main types of participants:

Task initiators, which are "users" who utilize the THETA edge computing platform to solve their computational tasks. A task initiator posts tasks for edge computing nodes to download and solve. Task initiators are also responsible for registering the tasks on the THETA blockchain and providing rewards (e.g., in THETA tokens, TFUEL tokens, another token or cryptocurrency, service, or redeemable IOUs) for each task. The tasks may range from solving a set of equations, finding novel protein structure to help fight COVID-19, to transcoding a video, and thousands of other applications that can leverage a network of distributed edge computing devices;

Edge Nodes, which may poll task initiators to obtain tasks. An edge node is a generic computational platform which can host various software including the solver for the tasks issued by the task initiator. Once a task is solved by an edge node, the edge node can upload the solution to the blockchain, to the task initiator, or to other virtual or physical storage entities.

Smart Contracts, as hosted by a blockchain. For example, one smart contract may act as a trustless escrow for task rewards, by establishing a reward payment pool. Once a submitted solution is verified, the reward may be transferred to the solver (i.e., an edge node) automatically.

THETA Blockchain-Based Ledger System

Figure 10:
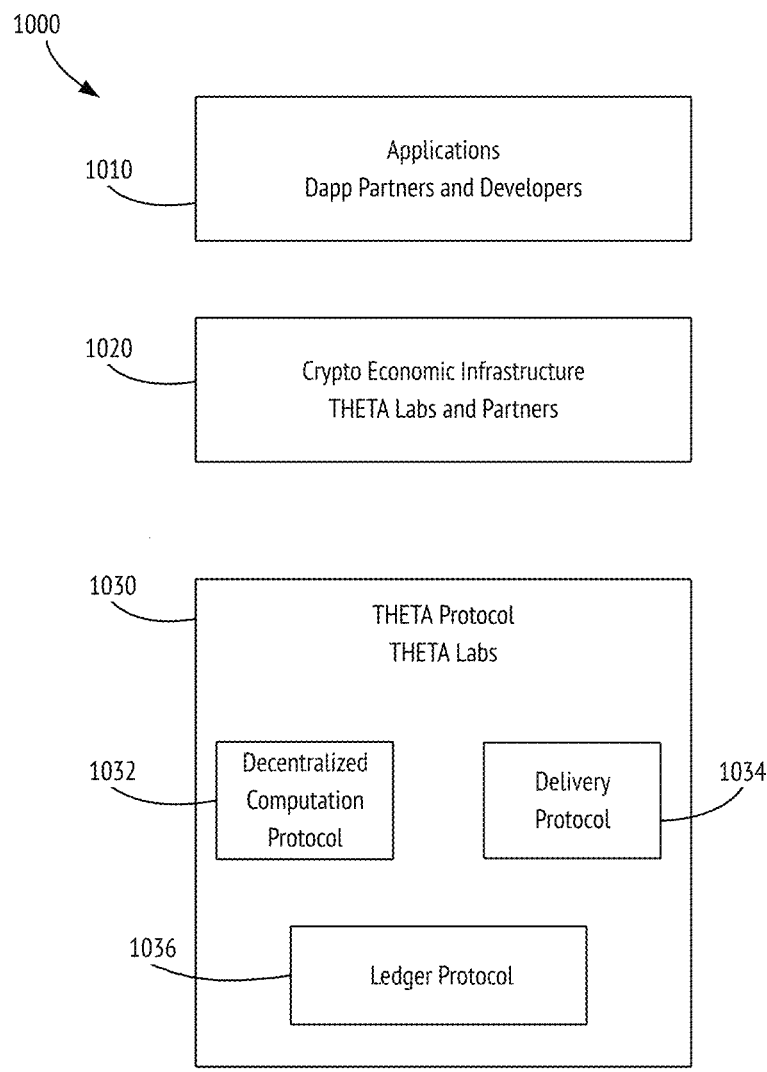
FIG. 10 is an exemplary block diagram of various layers within a THETA decentralized network infrastructure, in accordance with some embodiments of the present invention.

FIG. 10 is a block diagram of the THETA ecosystem 1000, with various layers within a THETA decentralized network infrastructure in accordance with some embodiments of the present invention. On a high level, several parties may be involved in the establishment and evolution of the THETA generalized data delivery and computing ecosystem, including but not limited to, Decentralized Application (DApp) developers, THETA Labs, and partners. As used herein, THETA Labs refers to an organization that provides protocol level design and support for the network, platform, system, and services as disclosed herein.

First, a THETA protocol layer 1030 as designed and developed by THETA labs provides the framework for enabling blockchain operations as well as data delivery and resource sharing capabilities. In some embodiments, THETA protocol layer 1030 may include a ledger protocol 1036, a decentralized computation protocol 1032, and a decentralized data delivery protocol 1034. These protocols may work together to implement one or more transaction verification, block assembly and consensus, cryptocurrency token economics, and decentralized applications that may assign, allocate, or share different types of resources via smart contracts enabled by the THETA blockchain. Exemplary embodiments of the decentralized data delivery protocol 1034 are explained in issued U.S. Pat. No. 10,771,524 (Methods and Systems for a Decentralized Data Streaming and Delivery Network, incorporated by reference in its entirety herein).

A blockchain is a decentralized, distributed, public ledger, in the form of a list of public transaction records or transactions that are written into blocks of data and linked through cryptography. A blockchain is typically managed through a peer-to-peer network, where each peer node maintains a full or partial copy of the blockchain. A blockchain relies on decentralized, cryptographic consensus among peers to achieve immutability, where a transaction record cannot be modified once written into a block and the block is verified and accepted by peers. Block mining and validation refer to specific steps in the distributed consensus process that are required whenever a new transaction is added to the blockchain.

More specifically, a transaction is a data structure or signed message that is transmitted through a blockchain network of peer nodes, and recorded on the blockchain. A transaction may encode or record the transfer of value between different parties when used for payment, with one or more transaction inputs and one or more transaction outputs viewed as debits and credits against different entities involved in the transaction. The output of one transaction may be used as the input of another transaction. A user's balance, as recorded on a blockchain, is an aggregation of all transaction outputs controlled by the user through a cryptographic key, and that have not been spent as the input to other transactions yet. Furthermore, a transaction may contain a data payload for smart contract invocation or other similar purposes.

While some payment systems require a central authority to verify and clear transactions to maintain trust, a THETA blockchain ledger system such as implemented using ledger protocol 1036 can achieve global, decentralized consensus without such a central authority. That is, even though fiat currencies are often stored and transmitted digitally, fraud, double-spending, and other issues and disputes are prevented by clearing and settling electronic transfers or payments through centralized authorities such as individual banking institutions or clearing houses. By comparison, a blockchain-based cryptocurrency payment system relies on cryptography and distributed consensus among all peers for trusting the legitimacy of a transaction without dependence on third-parties. A blockchain is immutable, where modifications to transaction data may be nearly impossible, a property making it suitable for use by cryptocurrencies as a payment method in the above-mentioned reward system for decentralized computation.

In some embodiments, the THETA decentralized public ledger system may be built upon the following novel designs with Proof-of-Stake (POS) mining. First, a multi-level Byzantine Fault Tolerant (BFT) consensus mechanism allows thousands of blockchain nodes to participate in a consensus process while still supporting very high transaction throughput, for example, in the range of 1,000+ transactions per second. To minimize transaction confirmation delays, the THETA protocol may use a small set of blockchain nodes to form a validator committee, producing a chain of blocks as fast as possible using a practical BFT (PBFT)-like process. With a sufficient number of validators such as 10 to 20 nodes, the validator committee may produce blocks at a fast speed, while still retaining a high degree of difficulty to prevent an adversary from compromising the integrity of the blockchain. A transaction is "committed" once it is included in a new block. To be eligible to join the validator committee, a node may lock up a certain amount of stake for a period of time. The locked stake could be slashed or removed if malicious behavior is detected. For example, slashed cryptocurrency tokens may be burned or redistributed to other validators proportionally. The blocks that the committee reaches consensus on are called settled blocks, and the process by which they produce a chain of blocks is called the block settlement process.

Next, consensus participants called guardian nodes may validate and finalize the chain generated by the validator committee at checkpoint blocks. The guardian network is a super set of the validator committee, where a validator is also a guardian. With a certain amount of token lockup for a period of time, any node in the network may become a guardian. The guardians may download and examine the chain of blocks generated by the validator committee and try to reach consensus on the checkpoints. "Finalization" refers to convincing each honest or non-malicious guardian that more than a certain portion (e.g., $2/3$) of all the other guardians see the same chain of blocks. Blocks that the guardian nodes have reached consensus on are called finalized blocks, and the process by which they finalize the chain of blocks is called the block finalization process. Checkpoint blocks are a selected subset of blocks that satisfy a given set of conditions, for example, whose height is a multiple of some integer. The block height of a particular block refers to the number of confirmed blocks preceding it in the blockchain, starting from the genesis block (i.e., block zero). The "leapfrogging" finalization strategy leverages the immutability characteristic of the blockchain data structure, where as long as at least two guardian nodes agree on the hash of a block, with overwhelming probability, they would have the same copy of the entire blockchain up to that block. The validator/guardian division provides multiple levels of security guarantee. The validator committee provides a first level of consensus, and the guardian pool forms a second line of defense. With thousands of nodes, it is substantially more difficult to compromise the integrity of the network, and thus provides a higher level of security. This consensus mechanism achieves good trade-offs among transaction throughput, consistency, and level of decentralization.

In some embodiments, the THETA blockchain network uses an aggregated signature gossip scheme to significantly reduce messaging complexity. Each guardian node keeps combining partially aggregated signatures from all its neighbors, and then gossips out the aggregated signature. This way the signature share of each node can reach other nodes at an exponential rate. In addition, signature aggregation keeps the size of the node-to-node messages relatively small, and thus further reduces communication overhead.

Furthermore, in some embodiments, edge nodes in the THETA network may be configured into "elite edge nodes" with stakes to avoid certain types of attacks such as Sybil attacks, and the aggregated signature gossip routine may be enhanced to prove the uptime of such elite edge nodes, with rewards to encourage edge node counts and resource capacity in the network. In particular, elite edge nodes may be connected to validator and guardian nodes to form a joint mesh network. Elite edge nodes may broadcast their verification signatures such as Boneh-Lynn-Shacham (BLS) signatures of the latest checkpoint block to guardian nodes to aggregate. Such BLS signature shares of the active elite nodes are aggregated by guardians into one signature, and written into the blockchain through new blocks proposed by validators. That is, the BLS signature share of an elite node proves that the node was up and running when the corresponding block was produced. In some embodiments, for each checkpoint block, a subset of elite edge nodes may be sampled, deterministically or randomly, to receive a "uptime mining" reward. To avoid missing such rewards, an elite edge node needs to stay online, download the latest block header, check if it is in the sampled set, and sign the checkpoint block hash and gossip out the signature if selected. This incentive mechanism maximizes the uptime of edge nodes, and thus improves the availability of the THETA network.

In some embodiments, the THETA ledger system offers off-chain Resource-Orientated Micropayment Pools. A micropayment pool enables small one-to-one, one-to-many and many-to-one payments using off-chain transactions. For decentralized computing, a task initiator can pay for computation by multiple edge nodes, and an edge node can be paid for computation completed for multiple tasks and multiple task initiators, all with only a limited number of on-chain transactions.

In some embodiments, the THETA ledger system provides native support of smart contracts which implements decentralized computer applications stored on a blockchain and can be called and executed when predetermined or preexisting terms and conditions are met, or when an agreement between participating parties is reached (e.g., as confirmed via electronic signatures). More specifically, a smart contract is a computer program written into a blockchain. Within the peer-to-peer blockchain network, each node may be viewed as part of an emulated global computer that runs the smart contracts. Once created and deployed, contract code cannot be modified, and the smart contract becomes immutable. Changes to a smart contract requires the deployment of new instances. A deployed smart contract may be invoked, called, and executed deterministically, for example, upon the submission of a transaction directed to a contract address. That is, when a transaction destination is a contract address, the commitment of the transaction to the blockchain may cause the contract to be run with the transaction's data payload as input. For example, transaction data may indicate which specific function of the smart contract to call with which specific input parameter values. Furthermore, a smart contract may react to a transaction by further calling or invoking another smart contract, or functions within the other smart contract. In various embodiments, smart contracts may be written in high-level programming languages such as Solidity, Serpent, Vyper, Bamboo, and the like.

In some embodiments, specialized incentive smart contracts may be used in the creation and management of micropayment pools or reward pools, especially when a large number of different parties are involved. Rather than requiring complex application logic, an incentive smart contract simplifies the process of collecting and distributing rewards based on certain pre-defined criteria and allocations across different parties, such as task initiators, edge workers, advertisers, content providers, viewers, elite edge nodes, and even miners in the blockchain network. In order for a recipient to receive a payment, a certain proof may be sent to the smart contract. Upon proof validation, the smart contract may initiate the reward, without involving original funders of the incentive smart contract.

In some embodiments, smart contracts may facilitate distributed computing and automatic reward processes. That is, the deployment of smart contracts on the THETA blockchain may allow computing tasks to be registered or "posted", verified, and further paid for when verified. A smart contract may be triggered to verify a solution when the solution is received from an edge computing node, or be triggered to transfer a token award from a reward pool to an edge computing node if a notification is received from a task initiator indicating that a solution generated by the edge computing node has been successfully verified.

As further shown in FIG. 10, in a more generalized framework, a crypto economic infrastructure layer 1020 may support incentivization, reward pooling, and micropayment process implementations within the THETA decentralized data delivery and computing network. A set of Application Programming Interfaces (APIs)/libraries may be provided by THETA Labs for developers to build smart contracts and crypto wallets. For example, in addition to direct incentive mechanisms for peer-to-peer models where end users send rewards to caching or computing nodes in exchange for resource sharing, the THETA network may also allow incentive mechanisms where an edge node can function as a blockchain miner node to validate transactions and assemble blocks, with more mining rewards provided when more resource is shared and better services are provided. In short, smart contracts on the THETA network may enable reward models, transparent reward distributions, trustless crowdfunding mechanisms, and other social and crypto-economic interactivities, all in support of THETA network's core functionalities that include, but are not limited to, data delivery and distributed computing.

Lastly, an applications layer 1010 in the THETA ecosystem 1000 provides a platform for programming and integrating decentralized applications (DApps) by DApp partners and developers. A Decentralized Application may include one or more smart contracts on a blockchain, and a web frontend user interface. The THETA network enables user interfaces (UIs) and program codes implementing application-level logic consistent with user expectations of the decentralized applications. In addition, a THETA JavaScript mesh networking library may be used to build the decentralized data delivery and computing network, and a THETA SDK may be used for integration of the applications with existing software and/or hardware.

Decentralized Edge Computing with On-chain Solution Verification

In this section and the subsequent one, the design and system architecture of a blockchain and smart contract-powered decentralized edge computing platform are provided.

Figure 11:
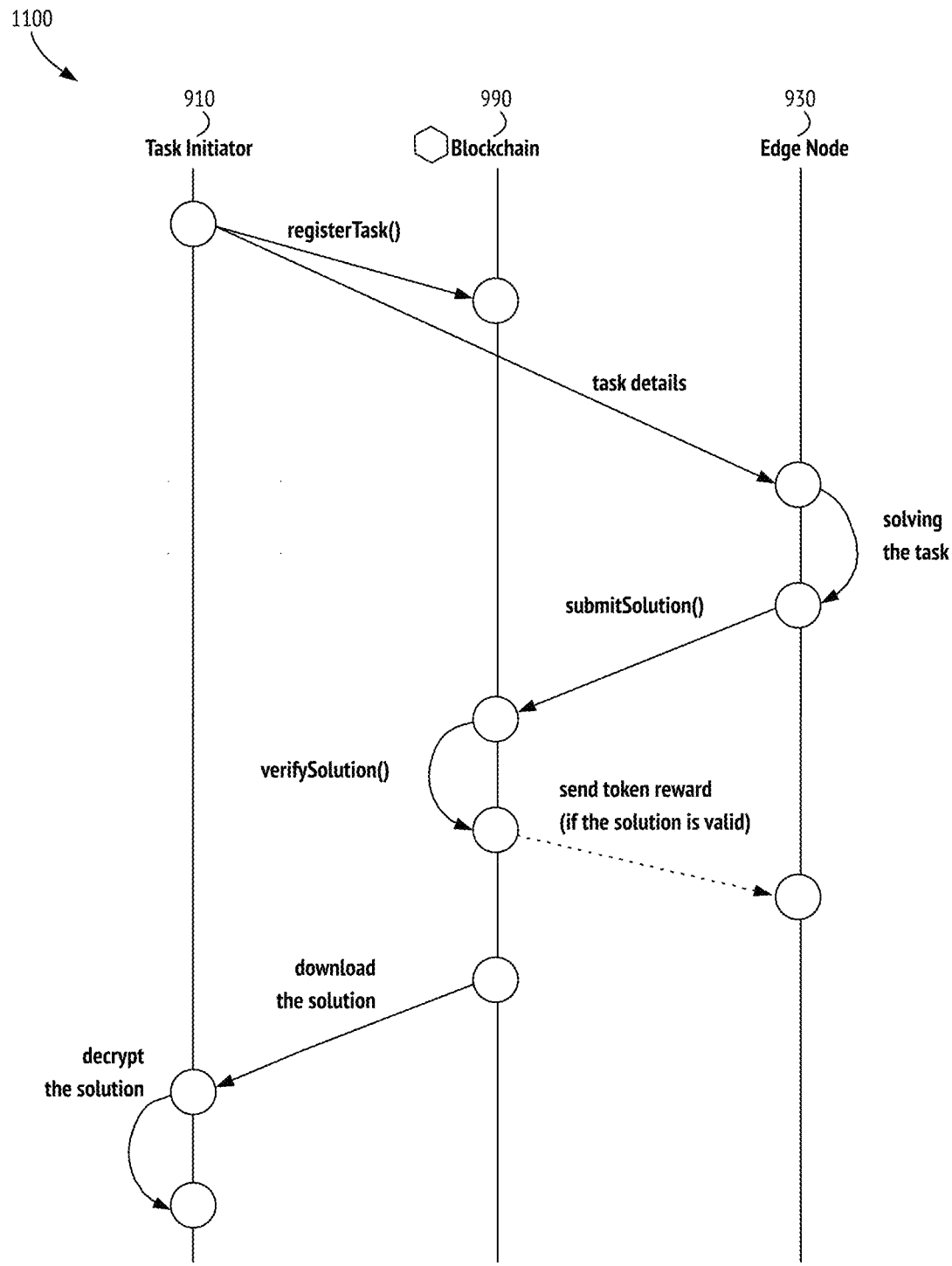
FIG. 11 shows an exemplary process diagram for distributed edge computing with on-chain solution verification and reward distribution via smart contracts on a blockchain, in accordance with some embodiments of the present invention.

FIG. 11 shows an exemplary process diagram 1100 for distributed edge computing with on-chain solution verification and reward distribution via smart contracts on a blockchain, according to one embodiment of the present invention. In this example, task initiator node 910 as shown in FIG. 9 assigns a computation task to edge computing node 930. Task solution verification and solver rewarding may be performed on-chain in a trustless fashion when a size of the solution as provided by edge computing node 930 is assumed to be small (e.g., a few kilobytes long).

In some embodiments, the task solution does not need to be kept secret. For such cases, unencrypted or plain-text solutions may be submitted to a blockchain smart contract directly for on-chain verification.

In some embodiments, task initiator 910 may be configured to not reveal solutions to the public. For such cases, edge node 930 may submit encrypted solutions to the blockchain. For a smart contract to verify the correctness of an encrypted solution without decrypting it, zero-knowledge proof techniques like non-interactive zero-knowledge proof may be used. In cryptography, a zero-knowledge proof technique or protocol is a method in which a first party known as the "prover" can prove to a second party known as a "verifier" that the prover possesses knowledge of certain information without revealing the information itself, or any other information apart from the fact that the prover knows the information. A non-interactive zero-knowledge proof is a zero-knowledge proof that requires no interactions between the prover and verifier. That is, after an initial setup phase, a single message may be sent from the prover to the verifier, without additional back-and-forth communication between the two parties. An exemplary non-interactive zero-knowledge proof is zk-SNARK, short for zero-knowledge Succinct Non-Interactive Arguments of Knowledge. "Succinct" refers to zero-knowledge proofs where the message is small in size when compared to the length of the information or solution being verified. With zk-SNARK, the correctness of computation may be verified without having to execute the computations or having to know what was executed. In the exemplary embodiment shown in FIG. 11, edge node 930 may generate a zk-SNARK proof for the solution it has computed for a task from task initiator 910, and submit the proof together with the encrypted solution to blockchain 990. More details on the design and use of zk-SNARKs are disclosed in zkSNARKs in a Nutshell by Christian Reitweibner (available at chriseth.github.io, and incorporated by reference in its entirety herein).

An added benefit of zk-SNARK is to reduce the computational cost of solution validation or verification, when the cost of on-chain solution verification using smart contracts is proportional to the number of computational steps of the verification process. The zk-SNARK technique can turn any computation in the class nondeterministic polynomial (NP) time complexity into a verification process with a constant number of steps, which can be conducted on-chain.

Table 3, listed at the end of the present disclosure, provides code snippets for an exemplary smart contract RewardPoolWithOnChainVerification written in the Solidity programming language for on-chain solution verification. In some embodiments, this smart contact may be initially deployed and/or later invoked by task initiator 910, and may have multiple functions or APIs including the following two functions:

registerTask( ) This function allows task initiator 910 to register a task on blockchain 990 by providing a function (e.g., hash function) of the task, and the address of another smart contract verifierContract, which may be responsible for verifying any solution submitted by one or more edge computing nodes for this particular task. The implementation of verifierContract may conform to the VerifierInterface interface in the exemplary code snippet shown in Table 3. In some embodiments, the verifierContract may be task-specific. That is, this verifier contract may be different for each different individual task, for different groups of individual tasks, or for different types of individual tasks. Before calling registerTask ( ) to register a task, task initiator 910 may deploy the verifierContract contract for that task on the blockchain and obtain the contract's address. In addition, task initiator 910 may provide rewards for solving this task. In some embodiments, a reward pool may be established by task initiator 910 on the blockchain by submitting a funding transaction to the blockchain with a reward deposit. In the exemplary code snippet shown in Table 3, TFUEL is used as token rewards (via msg.value), but rewards may be made in any token or cryptocurrency as disclosed herein. After this function registerTask ( ) is called, the smart contract records this task on the blockchain. As discussed previously, the chained RewardPoolWithOnChainVerification contract and the verifierContract contract may be viewed as a single smart contract or DApp on blockchain 990. When the verifierContract contract is task-specific, the RewardPoolWithOnChainVerification contract and multiple task-specific verifierContract contract instances may be viewed collectively as a single smart contract or DApp on the blockchain. Yet in some embodiments, functions within one more verifierContract contracts or may be implemented in the RewardPoolWithOnChainVerification contract directly.

submitSolution( ) This function allows an edge node 930 to submit a solution it has computed to the smart contract, and get rewarded if the solution is verified to be valid.

Non-Encrypted Solution Handling: In some embodiments, task initiator 910 may allow the solutions to be published on-chain, and edge node 930 may submit a plain-text solution as a byte string. As described by the exemplary Solidity code snippet shown in Table 3, the verifierContract smart contract may be called to validate the correctness of the solution, via a verifySolution( ) function. If the solution passes the checks, edge node 930 may be marked as the solver, and the reward (e.g., in the form of TFUEL or another token/cryptocurrency) may be sent to the solver automatically, for example, from a reward pool as established by task initiator 910.

Encrypted Solution Handling: In some embodiments, the system may be configured to not reveal the solutions publicly, and edge node 930 may submit an encrypted solution as well as a zk-SNARK proof zkProof to blockchain 990. More specifically, task initiator 910 may publish its public key so that edge node 930 may encrypt the solution using this public key (e.g., via the ElGamal encryption protocol). The verifySolution ( ) function of the verifierContract smart contract may verify the correctness of the zk-SNARK proof, which would prove that 1) the plain-text solution solves the task (e.g., satisfies a set of constraints), and 2) the solution submitted is indeed the encrypted plain-text solution using the public key of task initiator 910.

In the code example shown in Table 3, if multiple edge computing nodes solve the same task, only the first node that successfully submits the solution to the smart contract may obtain the reward. In some embodiments, a solution computed by this first node may be verified by the verifierContract contract before solutions computed by other nodes are verified. In some embodiments, multiple edge computing nodes may share the reward instead, with more than one solution verified by the verifierContract contract, and portions of an allocated reward transferred to individual nodes that have provided the solutions respectively. For example, reward splitting among multiple edge nodes may be implemented when the designated computation task involves certain randomness, and solutions provided by different edge computing nodes are all correct without being identical. In some embodiments, reward splitting among multiple edge computing nodes may be proportional to or scaled based on some characteristics, quality, or metadata of individual solutions submitted, such as a resolution, size, accuracy, sample variance, and the like.

FIG. 11 illustrates the interactions among three entities: task initiator 910, blockchain 990 which hosts the smart contracts, and edge computing node 930. Below is an interaction flow described at a high level. Although FIG. 11 only depicts one edge computing node 930, it may be extended to handle multiple edge computing nodes in a similar fashion.

Step 1: Task initiator 910 creates a task and registers the task on blockchain 990 by calling a function RewardPoolWithOnChainVerification.registerTask( ) Meanwhile, Task Initiator 910 may assign the task to edge computing node 930 by sending task details or task information to edge computing node 930, possibly through a secure channel. Task information refers to any one or combinations of task definition, description, metadata, input data, computing instructions, or the like, that allows edge computing node 930 to generate an acceptable solution to the task. In some embodiments, edge nodes may poll the RewardPoolWithOnChainVerification contract on regular intervals to see if another task is available. If there are additional tasks, an edge computing node may ping task initiator 910 to download task details. In different embodiments, task initiator 910 and edge computing node 930 may be viewed as having a server-client relationship, implemented through appropriate networking protocols. In some embodiments, they are implemented as peer nodes connected by a peer-to-peer connection.

Step 2: Edge computing node 930 solves the task, and calls the submitSolution( ) function on the RewardPoolWithOnChainVerification contract to submit the solution to the smart contract. If task initiator 910 requires solution encryption, edge computing node 930 may also provide a zk-SNARK proof zkProof.

Step 3: The RewardPoolWithOnChainVerification.submitSolution( ) function may call the verifierContract smart contract to verify the solution (and the zk-SNARK proof zkProof if applicable). Upon successful verification, a reward may be transferred to edge computing node 930 by the RewardPoolWithOnChainVerification contract.

Step 4: Task initiator 910 may download the verified encrypted solution from blockchain 990, and optionally use its private key to decrypt the solution.

Implementation of ToT System in the Blockchain-Supported Edge Computing Networks In some embodiments, the various modules and agents in the ToT framework may be implemented by edge nodes in a blockchain-supported edge computing network, such as those described above.

In some embodiments, a task initiator node may post a task to be solved by the ToT system. The task may be posted to a reward smart contract on a blockchain associated with the edge network. Tasks may include but are not limited to general mathematical and logical reasoning, problem-solving, solution searching, and decision-making tasks, which may require multi-step reasoning to solve. One or more edge nodes in the edge network may host and run the ToT system, including the ToT controller, the prompter agent, the LLM, the checker module, and the memory module. Each of the agents and modules may be run on the same or different sets of one or more edge nodes. The ToT controller, prompter agent, LLM, checker module, and memory module may communicate with each other on the peer-to-peer communication network of the edge computing network. The edge nodes running the ToT system can be automatically awarded for their work when a correct solution is submitted by the ToT system. In some embodiments, the ToT controller submits the final solution to the reward smart contract after the checker module deems the result a valid final solution. In other embodiments, any edge node running any module or agent within the ToT system, may submit the final solution to the reward smart contract. A submitted solution may be deemed correct with the on-chain verification method previously described, or an off-line solution verification by the task initiator node, or other means of solution verification. The rewards may be distributed to the edge nodes that ran the ToT system according to the reward smart contract on which the task was posted, and may be in the form of cryptocurrency tokens.

Additionally, in a similar way, the training of the ToT system, as described in the section "Controller and Prompter Training" may be carried out by one or more edge nodes in the edge computing network, such as the THETA Edge network. The edge nodes may execute training tasks such as policy gradient-based training for the ToT controller and prompter agent policy, as well as other multi-agent reinforcement learning algorithms. The training tasks may be posted to a reward smart contract deployed on a blockchain, and edge nodes that carry out the training task may be incentivized and rewarded by the reward smart contract on the blockchain.

Machine Learning (ML) and Neural Networks

Machine learning (ML) algorithms are characterized by the ability to improve their performance at a task over time without being explicitly programmed with the rules to perform that task (i.e., learn). A machine learning (ML) model is the output generated when a ML algorithm is trained on data. As described herein, embodiments of the present invention use one or more artificial intelligence (AI) and machine learning (ML) algorithms for implementing one or more components of LLM-based ToT solvers, including but not limited to the LLM, the checker module, the memory module, the ToT controller, and the prompter agent, as well as combinations thereof. Various exemplary ML algorithms are within the scope of the present invention. The following description describes illustrative ML techniques for implementing various embodiments of the present invention.

Neural Networks

Figure 12:
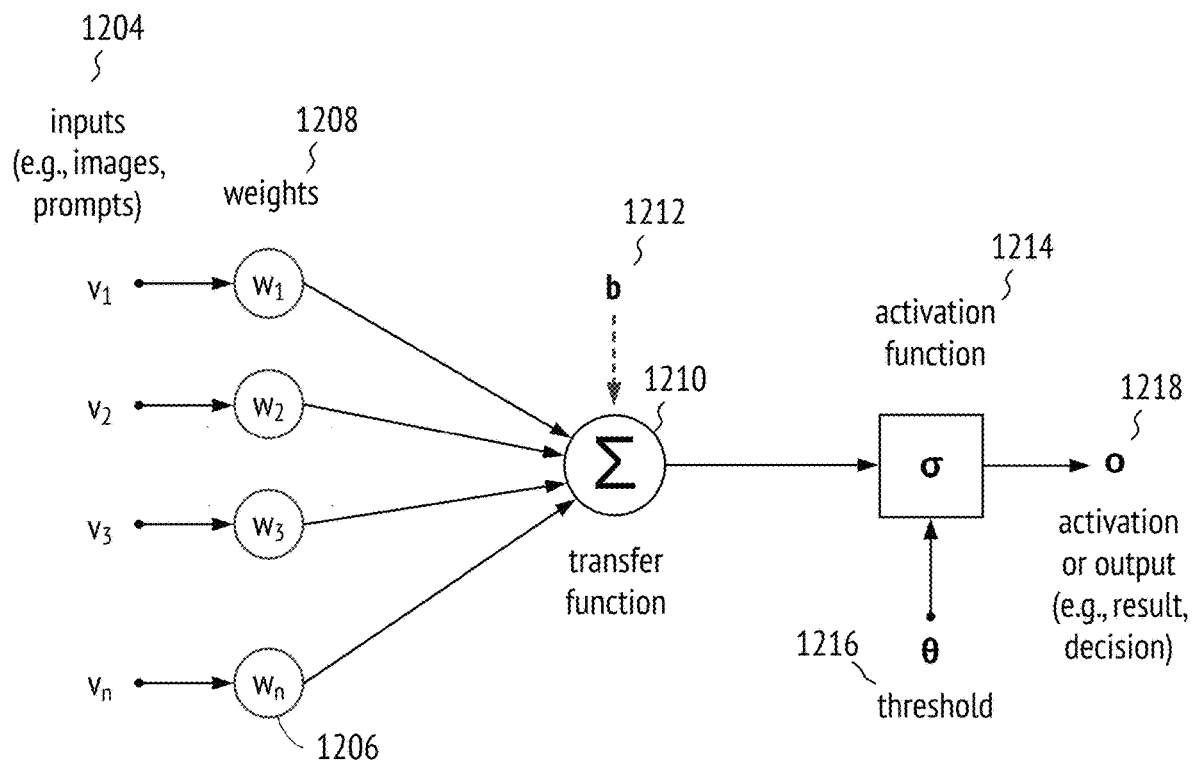
FIG. 12 describes a fundamental neural network operation as it relates to LLM-based ToT solvers, according to exemplary embodiments of the present invention.

A neural network is a computational model inspired by the structure of the human brain, consisting of interconnected units called neurons that work together to process information. It is a type of ML algorithm that is particularly effective for recognizing patterns and making predictions based on complex data. Neural networks are widely used in various applications such as image and speech recognition and natural language processing, due to their ability to learn from large amounts of data and improve their performance over time. FIG. 12 describes a fundamental neural network operation as it relates to LLM-based ToT solvers, according to exemplary embodiments of the present invention. Neural networks may be used to implement one or more components of the ToT solver, including but not limited to the LLM, the checker module, the memory module, the ToT controller, and the prompter agent, as well as combinations thereof.

FIG. 12 shows a single-layered neural network, also known as a single-layer perceptron. Such a perceptron is the building block for neural networking layers that may be used for implementing components of LLM-based ToT solvers, according to embodiments of the present invention. The operation of a single-layered neural network involves the following steps:

1. Input: Receiving an input vector v 1204 with elements $v_j$, with $j \in [1, n]$ representing the $j^{th}$ input, and where each element of the vector corresponds to a neuron 1206 in the input layer. In an exemplary ML or AI model deployed in the LLM-based ToT solver system, the input vector may be videos, images, text, documents, code, or a user prompt, as described in the present disclosure.
2. Transfer Function: Multiplying each input by a corresponding weight $w_j$ 1208. These weighted inputs are then summed together as the transfer function, yielding the net input to the activation function $\Sigma_{j=1}^{n} v_j \cdot w_j$ 1210. Each neuron in a neural network may have a bias value b 1212, which is added to the weighted sum of the inputs to that neuron. Both the weights and bias values are learned during the training process. The purpose of the bias is to provide every neuron with a trainable constant value that can help the model fit the data better. With biases, the net input to the activation function is $\Sigma_{j=1}^{n} \{v_j \cdot w_j\} + b$.
3. Activation Function: Passing the net input through an activation function 1214. The activation function σ determines the activation value o 1218, which is the output of the neuron. It is typically a non-linear function such as a sigmoid or ReLU (Rectified Linear Unit) function. The threshold θ 1216 of the activation function is a value that determines whether a neuron is activated or not. In some activation functions, such as the step function, the threshold is a specific value. If the net input is above the threshold, the neuron outputs a constant value, and if it's below the threshold, it outputs a zero value. In other activation functions, such as the sigmoid or ReLU (Rectified Linear Unit) functions, the threshold is not a specific value but rather a point of transition in the function's curve.
4. Output: The activation value o 1218 is the output of the activation function. This value is what gets passed on to the next layer in the network or becomes the final output in the case of the last layer. In an exemplary neural network model deployed in the LLM-based ToT solver system, the final output of the neural network may be an embedding or context vector representing an analysis result, a control signal, an intermediate solution, a prompt, a memory or state of the system, or a decision boolean variable.

Figure 13:
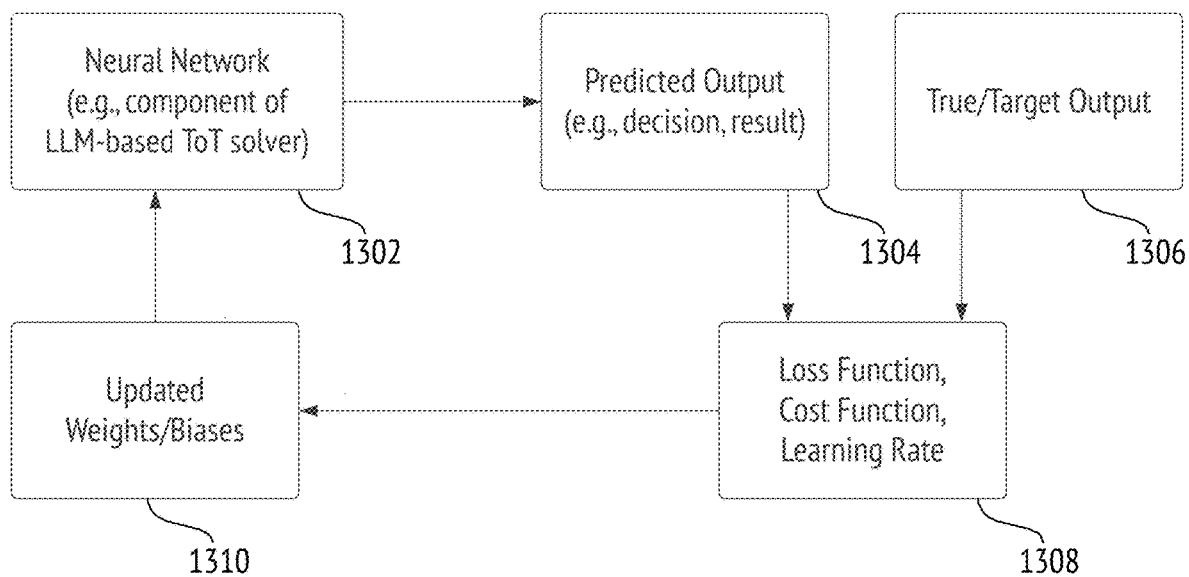
FIG. 13 shows an overview of the neural network training process that can be used for training components of an LLM-based ToT solver, according to exemplary embodiments of the present invention.

FIG. 13 shows an overview of the neural network training process that can be used for training components of an LLM-based ToT solver, according to exemplary embodiments of the present invention. This neural network training process can be deployed on a blockchain-supported edge computing network.

The neural network 1302 undergoing the training may comprise one or more components of the ToT solver, including but not limited to the LLM, the checker module, the memory module, the ToT controller, and the prompter agent, as well as combinations thereof. The training of a neural network involves repeatedly updating the weights and biases 1310 of the network to minimize the difference between the predicted output 1304 and the true or target output 1306, where the predicted output 1304 is the result produced by the network when a set of inputs from a dataset is passed through it. The true or target output 1306 is the true desired result. The difference between the predicted output and the true output is calculated using a loss function 1308, which quantifies the error made by the network in its predictions. In an exemplary neural network model deployed in the LLM-based ToT solver system, the predicted 1304 and true/target outputs 1306 of the neural network may be an embedding or context vector representing an analysis result, a control signal, an intermediate solution, a prompt, a memory or state of the system, or a decision boolean variable.

The loss function is a part of the cost function 1308, which is a measure of how well the network is performing over the whole dataset. The goal of training is to minimize the cost function 1308. This is achieved by iteratively adjusting the weights and biases 1310 of the network in the direction that leads to the steepest descent in the cost function. The size of these adjustments is determined by the learning rate 1308, a hyperparameter that controls how much the weights and biases change in each iteration. A smaller learning rate means smaller changes and a slower convergence towards the minimum of the cost function, while a larger learning rate means larger changes and a faster convergence, but with the risk of overshooting the minimum.

Neural network training combines the processes of forward propagation and backpropagation. Forward propagation is the process where the input data is passed through the network from the input layer to the output layer. During forward propagation, the weights and biases of the network are used to calculate the output for a given input. Backpropagation, on the other hand, is the process used to update the weights and biases 1310 of the network based on the error (e.g., cost function) 1308 of the output. After forward propagation through neural network 1302, the output 1304 of the network is compared with true output 1306, and the error 1308 is calculated. This error is then propagated back through the network, starting from the output layer and moving towards the input layer. The weights and biases 1310 are adjusted in a way that minimizes this error. This process is repeated for multiple iterations or epochs until the network is able to make accurate predictions.

The neural network training method described above, in which the network is trained on a labeled dataset (e.g., sample pairs of input user prompts and corresponding output recommendations), where the true outputs are known, is called supervised learning. In unsupervised learning, the network is trained on an unlabeled dataset, and the goal is to discover hidden patterns or structures in the data. The network is not provided with the true outputs, and the training is based on the intrinsic properties of the data. Furthermore, reinforcement learning is a type of learning where an agent learns to make decisions from the rewards or punishments it receives based on its actions. Although reinforcement learning does not typically rely on a pre-existing dataset, some forms of reinforcement learning can use a database of past actions, states, and rewards during the learning process. Any neural network training method that uses a labeled dataset is within the scope of the methods and systems described herein, as is clear from the overview below.

Transformer Model Architecture

The transformer architecture, which is used by LLM models in the ToT system depicted in FIG. 2, is a neural network design that was introduced in the paper "Attention is All You Need" by Vaswani et al. (available at https: arxiv.org-abs 1706.03762) published in June 2017, and incorporated herein by reference as if fully set forth herein. Large Language Models (LLMs) heavily rely on the transformer architecture.

The architecture (see FIG. 1 of the referenced paper) is based on the concept of "attention," allowing the model to focus on different parts of the input sequence when producing an output. Transformers consist of an encoder and a decoder. The encoder processes the input data and the decoder generates the output. Each of these components is made up of multiple layers of self-attention and point-wise, fully connected layers.

The layers of self-attention in the transformer model allow it to weigh the relevance of different parts of the input sequence when generating an output, thereby enabling it to capture long-range dependencies in the data. On the other hand, the fully connected layers are used for transforming the output of the self-attention layers, adding complexity and depth to the model's learning capability.

The transformer model is known for its ability to handle long sequences of data, making it particularly effective for tasks such as machine translation and text summarization. In the transformer architecture, positional encoding is used to give the model information about the relative positions of the words in the input sequence. Since the model itself does not have any inherent sense of order or sequence, positional encoding is a way to inject some order information into the otherwise order-agnostic attention mechanism.

The Embeddings Vector Space

In the context of neural networks, tokenization refers to the process of converting the input and output spaces, such as natural language text or programming code, into discrete units or "tokens." This process allows the network to effectively process and understand the data, as it transforms complex structures into manageable, individual elements that the model can learn from and generate.

In the training of neural networks, embeddings serve as a form of distributed word representation that converts discrete categorical variables (i.e., tokens) into a continuous vector space (i.e., embedding vectors). This conversion process captures the semantic properties of tokens, enabling tokens with similar meanings to have similar embeddings. These embeddings provide a dense representation of tokens and their semantic relationships. Embeddings are typically represented as vectors, but may also be represented as matrices or tensors.

The input of a transformer typically requires conversion from an input space (e.g., the natural language token space) to an embedding space. This process, referred to as "encoding," transforms discrete inputs (tokens) into continuous vector representations (embeddings). This conversion is a prerequisite for the transformer model to process the input data and understand the semantic relationships between tokens (e.g., words). Similarly, the output of a transformer typically requires conversion from the embeddings space to an output space (e.g., natural language tokens, programming code tokens, etc.), in a process referred to as "decoding." Therefore, the training of a neural network and its evaluation (i.e., its use upon deployment) both occur within the embedding space.

In the remainder of this document, the processes of tokenization, encoding, decoding, and detokenization are assumed. In other words, the processes described below occur in the "embeddings space." Hence, while the tokenization and encoding of training data and input prompts may not be represented or discussed explicitly, they are implied. Similarly, the decoding and detokenization of neural network outputs are also implied.

Training and Fine-Tuning Machine Learning (ML) Modules

Figure 14:
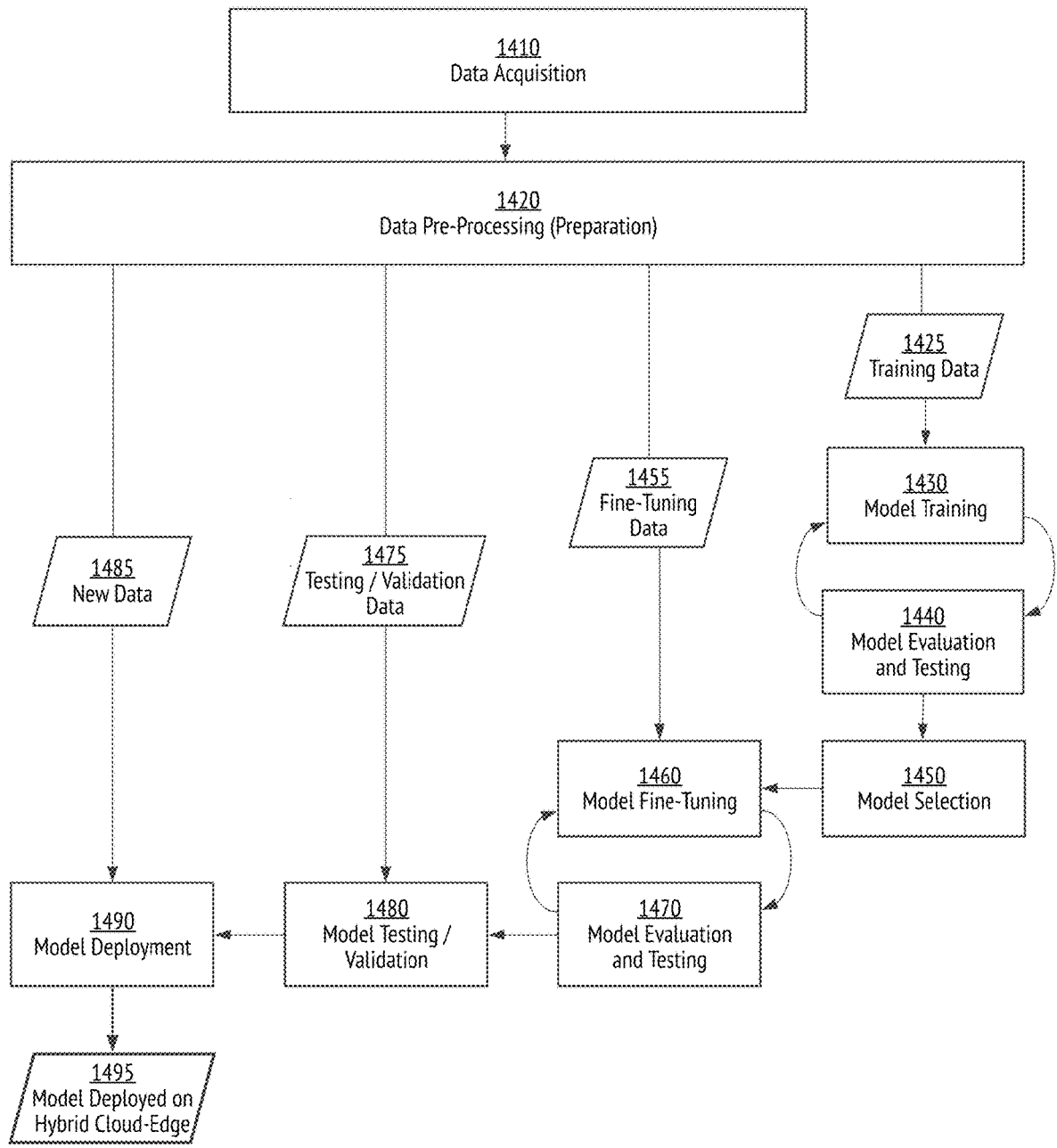
FIG. 14 is an illustrative flow diagram showing the different phases and datasets involved in training and deploying a machine learning algorithm for LLM-based ToT solvers, according to exemplary embodiments of the present invention.

FIG. 14 is an illustrative flow diagram showing the different phases and datasets involved in training and deploying a machine learning algorithm for LLM-based ToT solvers, according to exemplary embodiments of the present invention. Neural networks may be used to implement one or more components of the ToT solver, including but not limited to the LLM, the checker module, the memory module, the ToT controller, and the prompter agent, as well as combinations thereof.

The training process begins at step 1410 with the acquisition, retrieval, assimilation, or generation of data related to the machine learning application. At step 1420, acquired data are pre-processed, or prepared. At step 1430, the ML model (e.g., an exemplary component of LLM-based ToT solver) is trained using training data 1425. At step 1440, the ML model is evaluated, validated, and tested, and further refinements to the ML model are fed back into step 1430 for additional training. Once its performance is acceptable, at step 1450, optimal model parameters are selected.

Training data 1425 is a documented data set containing multiple instances of system inputs and correct outcomes. It trains the ML model to optimize the performance for a specific target task. In FIG. 14, training data 1425 may also include subsets for validating and testing the ML model, as part of the training iterations 1430 and 1440. For an NN-based ML model, the quality of the output may depend on (a) NN architecture design and hyperparameter configurations, (b) NN coefficient or parameter optimization, and (c) quality of the training data set. These components may be refined and optimized using various methods. For example, training data 2825 may be expanded via an augmentation process.

In some embodiments, an additional fine-tuning 1460 phase including iterative fine-tuning 1460 and evaluation, validation, and testing 1470 steps, is carried out using fine-tuning data 1455. Fine-tuning in machine learning is a process that involves taking a selected 1450 pre-trained model and further adjusting or "tuning" its parameters to better suit a specific task or fine-tuning dataset 1455. This technique is particularly useful when dealing with deep learning models that have been trained on large, general training datasets 1425 and are intended to be applied to more specialized tasks or smaller datasets. The objective is to leverage the knowledge the model has already acquired during its initial training (often referred to as transfer learning) and refine it so that the model performs better on a more specific task at hand.

The fine-tuning process typically starts with a model that has already been trained on a large benchmark training dataset 1425, such as ImageNet for image recognition tasks. The model's existing weights, which have been learned from the original training, serve as the starting point. During fine-tuning, the model is trained further on a new fine-tuning dataset 1455, which may contain different classes or types of data than the original training set. This additional training phase allows the model to adjust its weights to better capture the characteristics of the new fine-tuning dataset 1455, thereby improving its performance on the specific task it is being fine-tuned for.

In some embodiments, additional test and validation 1480 phases are carried out using test and validation data 1475. Testing and validation of a ML model both refer to the process of evaluating the model's performance on a separate dataset 1475 that was not used during training, to ensure that it generalizes well to new unseen data. Validation of a ML model helps to prevent overfitting by ensuring that the model's performance generalizes beyond the training data.

While the validation phase is considered part of ML model development and may lead to further rounds of fine-tuning, the testing phase is the final evaluation of the model's performance after the model has been trained and validated. The testing phase provides an unbiased assessment of the final model's performance that reflects how well the model is expected to perform on unseen data, and is usually carried out after the model has been finalized to ensure the evaluation is unbiased.

Once the model is trained 1430, selected 1450, and optionally fine-tuned 1460 and validated/tested 1480, it is deployed 1490. Deployed ML models (e.g., components of LLM-based ToT solvers) 1495 usually receive new data 1485 that was pre-processed 1420.

In machine learning, data pre-processing 1420 is tailored to the phase of model development. During model training 1430, pre-processing involves cleaning, normalizing, and transforming raw data into a format suitable for learning patterns. For fine-tuning 1460, pre-processing adapts the data to align with the distribution of the specific targeted task, ensuring the pre-trained model can effectively transfer its knowledge. Validation 1480 pre-processing mirrors that of training to accurately assess model generalization without leakage of information from the training set. Finally, in deployment (1490 and 1495), pre-processing ensures real-world data matches the trained model's expectations, often involving dynamic adjustments to maintain consistency with the training and validation stages.

In various embodiments of the present invention, the data pre-processing step 1420, model training step 1430, model evaluation and testing step 1440, model selection step 1450, model fine-tuning step 1460, model evaluation and testing step 1470, model testing and validation step 1480, and model deployment step 1490 may be completed on the blockchain-supported edge computing network. The steps may be completed as different tasks or as part of a larger multi-step task that is coordinated by a coordinator node such as a task initiator node. In some embodiments, the steps may be assigned to be run on one or more cloud-based networks, one or more edge networks such as the blockchain-supported and incentivized THETA Edge Network, or a combination of cloud and edge networks.

Machine Learning Algorithms

Various exemplary ML algorithms are within the scope of the present invention. Such machine learning algorithms include, but are not limited to, random forest, nearest neighbor, decision trees, support vector machines (SVM), Adaboost, gradient boosting, Bayesian networks, evolutionary algorithms, various neural networks (including deep learning networks (DLN), convolutional neural networks (CNN), and recurrent neural networks (RNN)), etc.

ML modules based on transformers and Large Language Models (LLMs) are particularly well suited for the tasks described herein. The online article "Understanding Large Language Models—A Transformative Reading List," by S. Raschka (posted Feb. 7, 2023, available at sebastian-raschka.com), describes various LLM architectures that are within the scope of the methods and systems described herein, and is hereby incorporated by reference in its entirety herein as if fully set forth herein.

The input to each of the listed ML modules is a feature vector comprising the input data described above for each ML module. The output of the ML module is a feature vector comprising the corresponding output data described above for each ML module.

Prior to deployment, each of the ML modules listed above may be trained on one or more respective sample input datasets and on one or more corresponding sample output datasets. The input and output training datasets may be generated from a database containing a history of input instances and output instances, or may be generated synthetically by subject matter experts.

Implementation using Computer Program Products, Methods, and Computing Entities

Exemplary System Architecture

Figure 15:
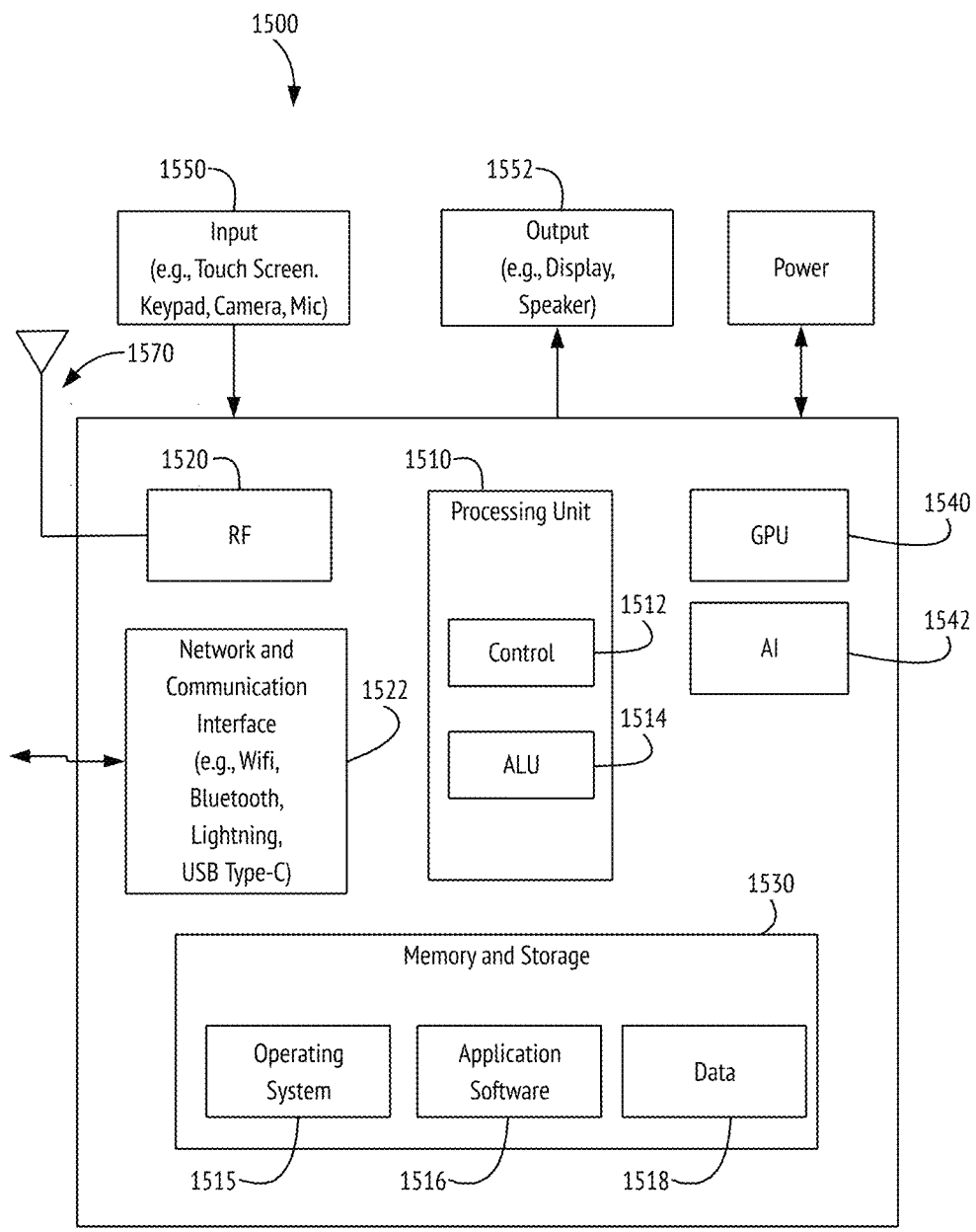
FIG. 15 is an exemplary schematic diagram of a user computing entity for implementing a peer node, according to exemplary embodiments of the present invention.
Figure 16:
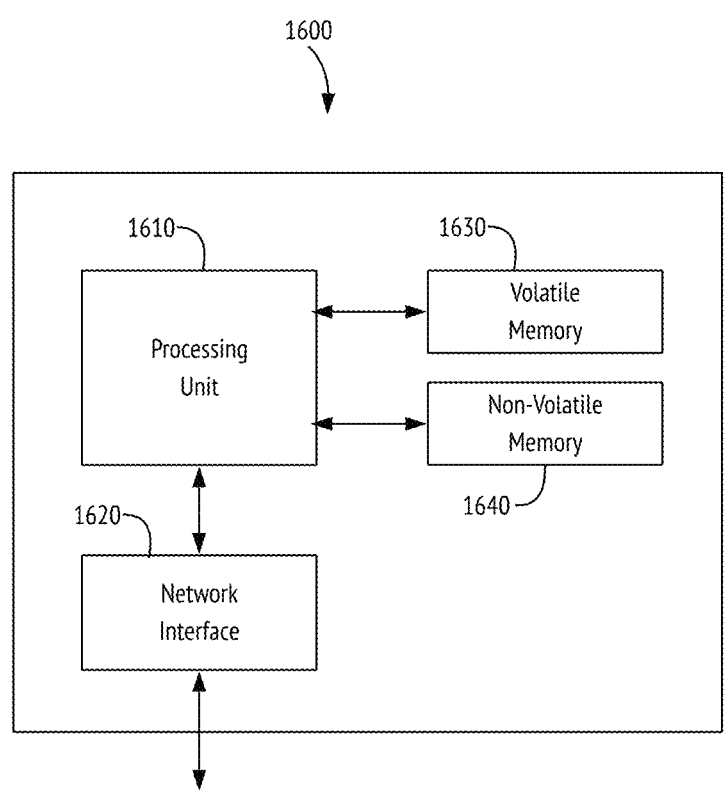
FIG. 16 is an exemplary schematic diagram of a management computing entity for implementing a server node, according to exemplary embodiments of the present invention.

An exemplary embodiment of the present disclosure may include one or more end user computing entities 1500, blockchain nodes, or other management computing entities 1600, as shown in FIGS. 15 and 16. Each of these components, entities, devices, systems, and similar words used herein interchangeably may be in direct or indirect communication with, for example, one another over the same or different wired or wireless networks. Additionally, while FIGS. 15 and 16 illustrate the various system entities as separate, standalone entities, the various embodiments are not limited to this particular architecture.

The computing entities 1500 and 1600 can be used to implement the algorithms, methods, and processes described herein. Non-transitory storage media store program code which encodes program instructions that implement the algorithms, methods, and processes described herein. The program code when executed by one or more hardware processors implement said algorithms, methods, and processes.

Exemplary User Computing Entity

FIG. 15 is an exemplary schematic diagram of a user computing entity for implementing a peer node such as an edge computing node or a task initiator node, according to exemplary embodiments of the present invention. An end user computing device 1500 capable of performing a computational task includes one or more components as shown. The peer node implemented on a user computing entity may run one or more components of the LLM-based ToT solver, including but not limited to the ToT controller, checker module, memory module, and prompter agent, as well as combinations thereof. As will be recognized, these architectures and descriptions are provided for exemplary purposes only and are not limited to the various embodiments.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, PlayStation, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, monitoring, evaluating, comparing, and/or similar terms used herein interchangeably. In various embodiments, these functions, operations, and/or processes can be performed on data, content, information, and/or similar terms used herein interchangeably. On the other hand, a task initiator/server, a tracker server, or payment server may be implemented according to the exemplary schematic diagram shown in FIG. 16, possibly in the cloud, and possibly with logically or physically distributed architectures.

As shown in FIG. 15, user computing entity 1500 may include an antenna 1570, a radio transceiver 1520, and a processing unit 1510 that provides signals to and receives signals from the transceiver. The signals provided to and received from the transceiver may include signaling information in accordance with air interface standards of applicable wireless systems. In this regard, user computing entity 1500 may be capable of operating with one or more air interface standards, communication protocols, modulation types, and access types. More particularly, user computing entity 1500 may operate in accordance with any of a number of wireless communication standards and protocols. In some embodiments, user computing entity 1500 may operate in accordance with multiple wireless communication standards and protocols, such as 5G, UMTS, FDM, OFDM, TDM, TDMA, E-TDMA, GPRS, extended GPRS, CDMA, CDMA2000, 1×RTT, WCDMA, TD-SCDMA, GSM, LTE, LTE advanced, EDGE, E-UTRAN, EVDO, HSPA, HSDPA, MDM, DMT, Wi-Fi, Wi-Fi Direct, WiMAX, UWB, IR, NFC, ZigBee, Wibree, Bluetooth, and/or the like. Similarly, user computing entity 1500 may operate in accordance with multiple wired communication standards and protocols, via a network and communication interface 1522.

Via these communication standards and protocols, user computing entity 1500 can communicate with various other computing entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). User computing entity 1500 can also download changes, add-ons, and updates, for instance, to its firmware, software (e.g., including executable instructions, applications, program modules), and operating systems.

In some implementations, processing unit 1510 may be embodied in several different ways. For example, processing unit 1510 may be embodied as one or more complex programmable logic devices (CPLDs), microprocessors, multi-core processors, coprocessing entities, application-specific instruction-set processors (ASIPs), microcontrollers, and/or controllers. Further, the processing unit may be embodied as one or more other processing devices or circuitry. The term circuitry may refer to an entirely hardware embodiment or a combination of hardware and computer program products. Thus, processing unit 1510 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 1510 may be configured for a particular use or configured to execute instructions stored in volatile or non-volatile media or otherwise accessible to the processing unit. As such, whether configured by hardware or computer program products, or by a combination thereof, processing unit 1510 may be capable of performing steps or operations according to embodiments of the present invention when configured accordingly.

In some embodiments, processing unit 1510 may comprise a control unit 1512 and a dedicated arithmetic logic unit 1514 (ALU) to perform arithmetic and logic operations. In some embodiments, user computing entity 1500 may comprise a graphics processing unit 1540 (GPU) for specialized image and video rendering tasks, and/or an artificial intelligence (AI) accelerator 1542, specialized for applications including artificial neural networks, machine vision, and machine learning. In some embodiments, processing unit 1510 may be coupled with GPU 1540 and/or AI accelerator 1542 to distribute and coordinate processing tasks.

In some embodiments, user computing entity 1500 may include a user interface, comprising an input interface 1550 and an output interface 1552, each coupled to processing unit 1510. User input interface 1550 may comprise any of a number of devices or interfaces allowing the user computing entity 1500 to receive data, such as a keypad (hard or soft), a touch display, a mic for voice/speech, and a camera for motion or posture interfaces. User output interface 1552 may comprise any of a number of devices or interfaces allowing user computing entity 1500 to provide content and information to a user, such as through a touch display, or a speaker for audio outputs. In some embodiments, output interface 1552 may connect user computing entity 1500 to an external loudspeaker or projector, for audio or visual output.

User computing entity 1500 may also include volatile and/or non-volatile storage or memory 1530, which can be embedded and/or may be removable. A non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store an operating system 1515, application software 1516, data 1518, databases, database instances, database management systems, programs, program modules, SDKs, scripts, source code, object code, byte code, compiled code, interpreted code, machine code, executable instructions, and/or the like to implement the functions of user computing entity 1500. As indicated, this may include a user application that is resident on the entity or accessible through a browser or other user interface for communicating with a management computing entity and/or various other computing entities.

In some embodiments, user computing entity 1500 may include location determining aspects, devices, modules, functionalities, and/or similar words used herein interchangeably. For example, user computing entity 1500 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites. Alternatively, the location information may be determined by triangulating the user computing entity's position in connection with a variety of other systems, including cellular towers, Wi-Fi access points, and/or the like. Similarly, user computing entity 1500 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters. Location information thus obtained may be used in determining nearby peers for data distribution and retrieval.

In some embodiments, two or more users may establish a connection between their computing devices using any of the networking protocols listed previously, and any peer-to-peer protocols including BitTorrent, or that provided by the THETA network. In some embodiments, the user computing devices may use a network interface such as 1522 to communicate with various other computing entities, to exchange data content, information, and/or similar terms used herein interchangeably that can be transmitted, received, operated on, processed, displayed, stored, and/or the like.

In some embodiments, data (e.g., audio, video, etc.) may be downloaded by one or more user computing devices to a server such as shown in FIG. 15 when the device accesses a network connection, such as a wireless access point or hotspot. The data transfer may be performed using protocols like file transfer protocol (FTP), MQ telemetry transport (MQTT), advanced message queuing protocol (AMQP), hypertext transfer protocol (HTTP), and HTTP secure (HTTPS). These protocols may be made secure over transport layer security (TLS) and/or secure sockets layer (SSL).

Exemplary Management Computing Entity

FIG. 16 is an exemplary schematic diagram of a management computing entity or server node 1600, such as a task initiator/server, a tracker server, or a blockchain node, for implementing the THETA decentralized computing network, according to exemplary embodiments of the present invention. The server node 1600 may also implement one or more components of the LLM-based ToT solver, including but not limited to the ToT controller, checker module, memory module, and prompter agent, as well as combinations thereof. The terms computing entity, computer, entity, device, system, and/or similar words used herein interchangeably are explained in detail with reference to user computing entity 1500.

As indicated, in one embodiment, management computing entity 1600 may include one or more network or communications interface 1620 for communicating with various computing entities, such as by communicating data, content, information, and/or similar terms used herein interchangeably that can be transmitted, received, operated on, processed, displayed, stored, and/or the like. For instance, management computing entity 1600 may communicate with user computing device 1500 and/or a variety of other computing entities. Network or communications interface 1620 may utilize a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 1600 may be configured to communicate via wireless external communication networks using any of a variety of standards and protocols as discussed with reference to user computing device 1500.

As shown in FIG. 16, in one embodiment, management computing entity 1600 may include or be in communication with one or more processing unit 1610 (also referred to as processors, processing circuitry, processing element, and/or similar terms used herein interchangeably) that communicate with other elements within the management computing entity 1600. As will be understood, processing unit 1610 may be embodied in a number of different ways. For example, as one or more CPLDs, microprocessors, multi-core processors, coprocessing entities, ASIPs, microcontrollers, and/or controllers, in the form of integrated circuits, application specific integrated circuits (ASICs), field programmable gate arrays (FPGAs), programmable logic arrays (PLAs), hardware accelerators, other circuitry, and/or the like. As will therefore be understood, processing unit 1610 may be configured for a particular use or configured to execute instructions stored in volatile or non-volatile media 1630 and 1640. As such, whether configured by hardware or computer program products, or by a combination thereof, processing unit 1610 may be capable of performing steps or operations according to embodiments of the present disclosure when configured accordingly.

Although not shown explicitly, management computing entity 1600 may include or be in communication with one or more input elements, such as a keyboard, a mouse, a touch screen/display, a camera for motion and movement input, a mic for audio input, a joystick, and/or the like. Management computing entity 1600 may also include or be in communication with one or more output elements such as speaker, screen/display, and/or the like.

In various embodiments, one or more of the components of management computing entity 1600 may be located remotely from other management computing entity components, such as in a distributed system or in the cloud. Furthermore, one or more of the components may be combined and additional components performing functions described herein may be included in the management computing entity 1600. Thus, the management computing entity 1600 can be adapted to accommodate a variety of needs and circumstances. As will be recognized, these architectures and descriptions are provided for exemplary purposes only and are not limited to the various embodiments.

Additional Implementation Details

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skills in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g., any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware may also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of streaming content and information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module, or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually affect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although specific embodiments of the disclosure have been described, one of ordinary skills in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skills in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modifications and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

TABLE 1

Exemplary Checker Module for ToT Sudoku Solver

```
import json
import copy
import common.consts as consts
class StateCheckerBase(object):
    def __init__(self, state_manager) -> None:
        self.state_manager = state_manager
    def check_current_state(self):
        return None
class SudokuStateCheckResults:
    def __init__(self) -> None:
        self.rows = [ ]
        self.cols = [ ]
        self.is_valid = False
        self.solution_found = False
```

TABLE 1-continued

Exemplary Checker Module for ToT Sudoku Solver

```
        self.message = ""
class RuleBasedSudokuStateChecker(StateCheckerBase):
    def __init__(self, state_manager) -> None:
        super( ).__init__(state_manager)
    def check_current_state(self):
        init_board = self.state_manager.get_initial_state( )
        if init_board is None:
            raise "The initial board is invalid"
        current_board = self.state_manager.get_current_state( )
        if current_board is None:
            raise "The current board is invalid"
        return RuleBasedSudokuStateChecker.check_sudoku_board(init_board, current_board)
    def check_sudoku_board(init_board, current_board):
        result = SudokuStateCheckResults( )
        for row in current_board:
            result.rows.append(row.tolist( )[0])
        for col_idx in range(current_board.shape[1]):
            col = current_board[:, col_idx]
            result.cols.append(col.squeeze( ).tolist( )[0])
        # Check constraint 1: the current board must have the same size as the initial board
        board_size = init_board.shape[0]
        if (current_board.shape[0] != board_size) or (current_board.shape[1] != board_size):
            result.is_valid = False
            result.message = "The current Sudoku board has a size different than the original board."
            return result
        # Check constraint 2: the board must be filled with numbers from 1-n with no repeated numbers in each line, horizontally or vertically.
        for i in range(len(result.rows)):
            row = result.rows[i]
            has_duplicates, duplicated_elem = RuleBasedSudokuStateChecker._has_duplicates(row)
            if has_duplicates:
                result.is_valid = False
                msg_tmpl = """Row { } is invalid, it contains two { }s."""
                result.message = msg_tmpl.format(json.dumps(row), duplicated_elem)
                return result
        for j in range(len(result.cols)):
            col = result.cols[j]
            has_duplicates, duplicated_elem = RuleBasedSudokuStateChecker._has_duplicates(col)
            if has_duplicates:
                result.is_valid = False
                msg_tmpl = """Column { } is invalid, it contains two { }s."""
                result.message = msg_tmpl.format(json.dumps(col), duplicated_elem)
                return result
        # Check constraint 3: the current board should not overwrite the cells that are already filled before puzzle solving, or has invalid content
        valid_content = [str(i+1) for i in range(board_size)]
        valid_content.append(consts.SUDOKU_UNFILLED_CELLS_PLACEHOLDER)
        for i in range(board_size):
            for j in range(board_size):
                if not current_board[i, j] in valid_content:
                    result.is_valid = False
                    msg_tmpl = """Cell [{ }][{ }] contains an invalid character. It should be either the string representation of a number between 1 to { }, or *"""
                    result.message = msg_tmpl.format(i, j, board_size)
                    return result
                if (init_board[i, j] != consts.SUDOKU_UNFILLED_CELLS_PLACEHOLDER and init_board[i, j] != current_board[i, j]):
                    result.is_valid = False
                    msg_tmpl = """Cell [{}][{}] is invalid. The corresponding cell has been filled with { } initially. We cannot set it to a different number."""
                    result.message = msg_tmpl.format(i, j, init_board[i, j])
                    return result
        # Check constraint 4: The numbers in each block are distinct
        # [Pseudocode for checking constraint 4 here is analogous]
        msg_tmpl = """The current board is valid. The rows are [{ }], and the columns are [{ }]"""
        result.message = msg_tmpl.format(json.dumps(result.rows),
```

TABLE 1-continued

Exemplary Checker Module for ToT Sudoku Solver

```
            json.dumps(result.cols))
        result.is_valid = True
        has_unfilled_cells = False
        for i in range(board_size):
            for j in range(board_size):
                if str(current_board[i, j]) == "*":
                    has_unfilled_cells = True
        result.solution_found = not has_unfilled_cells
        return result
    def _has_duplicates(vec):
        if len(vec) <= 1:
            return False
        v = copy.deepcopy(vec)
        v = sorted(v)
        for i in range(len(v) - 1):
            if (not (str(v[i]) == "*")) and v[i] == v[i+1]:
                return True, v[i]
        return False, None
class LLMBasedSudokuStateChecker(StateCheckerBase):
    def __init__(self, state manager) -> None:
        super().__init__(state_manager)
    def check_current_state(self):
        return None
```

TABLE 2

Exemplary Memory Module for ToT Sudoku Solver

```
import json
class StateManagerBase(object):
    def __init__(self) -> None:
        pass
    def update_state(self, state_update_instructions) -> bool:
        pass
    def get_current_state(self) -> object:
        return None
    def get_state(self, rollback_steps) -> object:
        return None
    def rollback(self, rollback_steps) -> object:
        pass
class SudokuStateManager(StateManagerBase):
    def __init__(self) -> None:
        super().__init__()
        self.sudoku_matrix_history = [ ]
    def update_state(self, solution) -> bool:
        solution_key = json.dumps(solution.tolist( ))
        for state in self.sudoku_matrix_history:
            state_key = json.dumps(state.tolist( ))
            if solution_key == state_key: # duplicate detected
                return False
        self.sudoku_matrix_history.append(solution)
        return True
    def get_current_state(self) -> object:
        return self.get_state(0)
```

TABLE 2-continued

Exemplary Memory Module for ToT Sudoku Solver

```
    def is_at_initial_state(self) -> bool:
        return len(self.sudoku_matrix_history) == 1
    def get_initial_state(self) -> object:
        history_len = len(self.sudoku_matrix_history)
        if history_len == 0:
            return None
        return self.get_state(history_len-1)
    def get_state(self, rollback_steps) -> object:
        if len(self.sudoku_matrix_history) <= rollback_steps:
            return None
        return self.sudoku_matrix_history[-(rollback_steps+1)]
    def rollback(self, rollback_steps) -> bool:
        if len(self.sudoku_matrix_history) == 0:
            return False
        print ("START STATE ROLLBACK, current depth:
{ }".format(len(self.sudoku_matrix_history)))
        for state in self.sudoku_matrix_history:
            print ("State:", json.dumps(state.tolist( )))
        for i in range(rollback_steps):
            self.sudoku_matrix_history.pop( )
        print ("STATE ROLLBACK DONE, current depth:
{ }\n".format(len(self.sudoku_matrix_history)))
    def max_rollback_steps(self) -> int:
        return len(self.sudoku_matrix_history) - 1
```

TABLE 3

Exemplary Solidity Smart Contract for On-Chain Solution Verification

```
pragma solidity ^0.7.1;
interface VerifierInterface {
    function verifySolution(bytes memory solution, bytes memory zkProof)
external pure returns (bool);
}
contract RewardPoolWithOnChainVerification {
    struct Task {
        bytes32 hash;
        unit   reward;
        address payable solver;
        // another smart contract which can verify the task solution on-chain
        address verifierContract;
    }
    event RegisterTask(bytes32 taskHash, uint rewardAmount);
    event VerifiedSolution(bytes32 taskHash, bytes zkProof, address solver);
```

TABLE 3-continued

Exemplary Solidity Smart Contract for On-Chain Solution Verification

```
    address public taskInitiator;
    mapping(bytes32 => Task) public taskMap;
    constructor( ) {
        taskInitiator = msg.sender;
    }
    function registerTask(bytes32 taskHash, address verifierContract) public
payable {
        require(msg.sender == taskInitiator, "only task initiator can submit
task hash");
        require(taskMap[taskHash].hash == bytes32(0x0), "the task is already
registered");
        // Record the task on the blockchain
        taskMap[taskHash] = Task({
            hash: taskHash,
            reward: msg.value, // msg.value: amount of TFuelWei will be
automatically transfer to the contract
            solver: address(0x0),
            verifierContract: verifierContract
        });
        emit RegisterTask(taskHash, msg.value);
    }
    function submitSolution(bytes32 taskHash, bytes memory solution, bytes
memory zkProof) public {
        require(taskMap[taskHash].solver == address(0x0), "the task has been
marked as solved");
        VerifierInterface verifier =
VerifierInterface(taskMap[taskHash].verifierContract);
        if (verifier.verifySolution(solution, zkProof)) {
            address payable solver = msg.sender;
            taskMap[taskHash].solver = solver;
            uint reward = taskMap[taskHash].reward;
            taskMap[taskHash].solver.transfer(reward); // transfer the TFUEL
reward to the solver
            emit VerifiedSolution(taskHash, zkProof, solver);
        }
    }
}
```

What is claimed is:

1. A non-transitory computer-readable storage medium having instructions stored therein, which when executed by a processor, cause a problem-solving system to:
retrieve a training dataset for the problem-solving system,
  wherein the training dataset comprises pairs of given input and corresponding expected output of the problem-solving system,
  wherein each given input is a description of a given problem,
  wherein each corresponding expected output is a solution to the given problem,
  wherein the problem-solving system comprises a tree-of-thought (ToT) controller, the prompter agent, a memory module, a checker module, and a quizzer module,
  wherein the ToT controller comprises a controller policy network, and
  wherein the prompter agent comprises a prompter policy network;
generate, using the quizzer module, self-play-based training data for the problem-solving system;
augment the training dataset with the self-play-based training data to generate an augmented training dataset;
train the problem-solving system on the augmented training dataset,
  wherein the controller policy network in the ToT controller and the prompter policy network in the prompter agent are trained for a plurality of iterations,
  wherein during a first stage of a given iteration, the controller policy network is updated while the promoter policy network is fixed, and
  wherein during a second stage of the given iteration, the prompter policy network is updated while the controller policy network is fixed;
receive, using a prompter agent, a problem description of a problem from a user,
generate, using the prompter agent and based on the problem description, a first prompt to a large language model (LLM) to generate a first intermediate solution to the problem;
check, using the checker module, a validity of the first intermediate solution;
store, in the memory module, the first prompt, the first intermediate solution, and the validity of the first intermediate solution, as parts of a conversation and node visit history,
  wherein nodes in the conversation and node visit history form a search tree, and
  wherein each node in the search tree is associated with a partial solution to the problem;
check, using the checker module, a validity of a current partial solution associated with a current node in the search tree;
determine, using the ToT controller and based on the validity of the current partial solution and the conversation and node visit history, a next node to visit,
  wherein the next node to visit is an ancestor node of the current node in the search tree,
  wherein the next node to visit is determined by the controller policy network, and
  wherein the controller policy network takes as input a position embedding of a sequence of last visited nodes;

query the memory module to retrieve an ancestor partial solution associated with the ancestor node;

generate, using the prompter agent and based on the ancestor partial solution, a second prompt to the LLM to generate a second intermediate solution to the problem, wherein the prompter policy network takes as input the position embedding of the sequence of last visited nodes;

store, in the memory module, the second prompt and the second intermediate solution, as parts of the conversation and node visit history; and determine, using the checker module, whether the second intermediate solution is a valid final solution to the problem.

2. The non-transitory computer-readable storage medium of claim 1, wherein the determining the next search step by the ToT controller is based on a rule-based backtracking algorithm.

3. The non-transitory computer-readable storage medium of claim 1, wherein the prompter policy network takes as input a prompt template, the conversation and node visit history, and a set of in-context learning examples, and outputs a prompt for the LLM.

4. The non-transitory computer-readable storage medium of claim 1, wherein the checker module comprises a neural network classifier.

5. The non-transitory computer-readable storage medium of claim 1, wherein the LLM is implemented on one or more edge nodes in a decentralized blockchain-based network.

6. The non-transitory computer-readable storage medium of claim 1, wherein the ToT controller is implemented on one or more edge nodes in a decentralized blockchain-based network.

7. The non-transitory computer-readable storage medium of claim 6, wherein the instructions, which when executed by the processor, further cause the problem-solving system to:

in response to determining that the second intermediate solution is a valid final solution to the problem, submit the second intermediate solution to a reward smart contract deployed on a blockchain in the decentralized blockchain-based network; and receive a reward from the reward smart contract for submitting the second intermediate solution.

8. The non-transitory computer-readable storage medium of claim 6, wherein the ToT controller communicates with the memory module and the prompter agent through a peer-to-peer connection on the decentralized blockchain-based network.

9. The non-transitory computer-readable storage medium of claim 1, wherein the prompter agent is run on one or more edge nodes in a decentralized blockchain-based network.

10. The non-transitory computer-readable storage medium of claim 1, wherein the problem description is an instance of a puzzle, wherein the first intermediate solution is a partial puzzle solution, wherein the checker module is a rule-based checker of partial puzzle solutions, and wherein the ToT controller uses a rule-based backtracking algorithm.

11. The non-transitory computer-readable storage medium of claim 1, wherein the problem description is an instance of a multi-step problem-solving task, and wherein a plurality of problem-solving steps corresponds to the plurality of last visited nodes.

12. A method for a problem-solving system, the method comprising:

retrieving a training dataset for the problem-solving system, wherein the training dataset comprises pairs of given input and corresponding expected output of the problem-solving system, wherein each given input is a description of a given problem, wherein each corresponding expected output is a solution to the given problem, wherein the problem-solving system comprises a tree-of-thought (ToT) controller, the prompter agent, a memory module, and a checker module, and a quizzer module, wherein the ToT controller comprises a controller policy network, and wherein the prompter agent comprises a prompter policy network;

generating, using the quizzer module, self-play-based training data for the problem- solving system;

augmenting the training dataset with the self-play-based training data to generate an augmented training dataset;

training the problem-solving system on the augmented training dataset, wherein the controller policy network in the ToT controller and the prompter policy network in the prompter agent are trained for a plurality of iterations, wherein during a first stage of a given iteration, the controller policy network is updated while the promoter policy network is fixed, and wherein during a second stage of the given iteration, the prompter policy network is updated while the controller policy network is fixed;

receiving, using a prompter agent, a problem description of a problem from a user, generating, using the prompter agent and based on the problem description, a first prompt to a large language model (LLM) to generate a first intermediate solution to the problem;

checking, using the checker module, a validity of the first intermediate solution;

storing, in the memory module, the first prompt, the first intermediate solution, and the validity of the first intermediate solution, as parts of a conversation and node visit history, wherein nodes in the conversation and node visit history form a search tree, and wherein each node in the search tree is associated with a partial solution to the problem;

checking, using the checker module, a validity of a current partial solution associated with a current node in the search tree;

determining, using the ToT controller and based on the validity of the current partial solution and the conversation and node visit history, a next node to visit, wherein the next node to visit is an ancestor node of the current node in the search tree, wherein the next node to visit is determined by the controller policy network, and wherein the controller policy network takes as input a position embedding of a sequence of last visited nodes;

querying the memory module to retrieve an ancestor partial solution associated with the ancestor node;

generating, using the prompter agent and based on the ancestor partial solution, a second prompt to the LLM to generate a second intermediate solution to the problem,
   wherein the prompter policy network takes as input the position embedding of the sequence of last visited nodes;

storing, in the memory module, the second prompt and the second intermediate solution, as parts of the conversation and node visit history; and determining, using the checker module, whether the second intermediate solution is a valid final solution to the problem.

13. The method of claim 12, wherein the prompter policy network takes as input a prompt template, the conversation and node visit history, and a set of in-context learning examples, and outputs a prompt for the LLM.

14. The method of claim 12, wherein the ToT controller is implemented on one or more edge nodes in a decentralized blockchain-based network.

15. A tree-of-thought (ToT) problem-solving system, comprising:
   access to a large language model (LLM);
   access to a processor;
   a non-transitory physical medium for storing program code executable by the processor, the program code when executed by the processor causing the processor to implement:
      a prompter agent comprising a prompter policy network, adapted to generate a prompt for the LLM;
      a memory module adapted to store a conversation and node visit history, wherein the conversation and node visit history comprises conversations between the LLM and the prompter agent;
      a checker module adapted to determine a validity of a given partial solution associated with a given node in a search tree of a search process;
      a quizzer module adapted to generate self-play-based training data;
      a ToT controller comprising a controller policy network, wherein the ToT is adapted to direct the search process of the ToT problem-solving system by determining a backtracking policy based on a state of the memory module,
   wherein the non-transitory physical medium further stores program code that when executed by the processor causes the ToT controller to:
      retrieve a training dataset for the problem-solving system,
         wherein the training dataset comprises pairs of given input and corresponding expected output of the problem-solving system,
         wherein each given input is a description of a given problem, and
         wherein each corresponding expected output is a solution to the given problem;
      generate, using the quizzer module, self-play-based training data for the problem-solving system;
      augment the training dataset with the self-play-based training data to generate an augmented training dataset;
      train the problem-solving system on the augmented training dataset,
         wherein the controller policy network in the ToT controller and the prompter policy network in the prompter agent are trained for a plurality of iterations,
         wherein during a first stage of a given iteration, the controller policy network is updated while the promoter policy network is fixed, and
         wherein during a second stage of the given iteration, the prompter policy network is updated while the controller policy network is fixed;
      receive, using a prompter agent, a problem description of a problem from a user;
      generate, using the prompter agent and based on the problem description, a first prompt to the LLM to generate a first intermediate solution to the problem;
      check, using the checker module, a validity of the first intermediate solution;
      store, in the memory module, the first prompt, the first intermediate solution, and the validity of the first intermediate solution, as parts of the conversation and node visit history,
         wherein nodes in the conversation and node visit history form the search tree, and
         wherein each node in the search tree is associated with a partial solution to the problem;
      check, using the checker module, a validity of a current partial solution associated with a current node in the search tree;
      determine, using the ToT controller and based on the validity of the current partial solution and the conversation and node visit history, a next node to visit,
         wherein the next node to visit is an ancestor node of the current node in the search tree,
         wherein the next node to visit is determined by the controller policy network, and
         wherein the controller policy network takes as input a position embedding of a sequence of last visited nodes;
      query the memory module to retrieve an ancestor partial solution associated with the ancestor node;
      generate, using the prompter agent and based on the ancestor partial solution, a second prompt to the LLM to generate a second intermediate solution to the problem,
         wherein the prompter policy network takes as input the position embedding of the sequence of last visited nodes; and
      determine, using the checker module, whether the second intermediate solution is a valid final solution to the problem.

* * * * *